(12) United States Patent
Kratz et al.

(10) Patent No.: US 10,565,284 B2
(45) Date of Patent: Feb. 18, 2020

(54) APPARATUS FOR DETERMINING A SIMILARITY INFORMATION, METHOD FOR DETERMINING A SIMILARITY INFORMATION, APPARATUS FOR DETERMINING AN AUTOCORRELATION INFORMATION, APPARATUS FOR DETERMINING A CROSS-CORRELATION INFORMATION AND COMPUTER PROGRAM

(71) Applicant: Fraunhofer-Gesellschaft zur Foerderung der angewandten Forschung e.V., Munich (DE)

(72) Inventors: Michael Kratz, Erlangen (DE); Christian Uhle, Ursensollen (DE); Paul Klose, Fuerth (DE); Timothy Leonard, Nuremberg (DE); Peter Prokein, Erlangen (DE); Sebastian Scharrer, Altdorf (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/196,711

(22) Filed: Nov. 20, 2018

(65) Prior Publication Data
US 2019/0095398 A1 Mar. 28, 2019

Related U.S. Application Data

(63) Continuation of application No. PCT/EP2017/062044, filed on May 18, 2017.

(30) Foreign Application Priority Data

May 20, 2016 (EP) .................................. 16170744
Nov. 16, 2016 (EP) .................................. 16199181

(51) Int. Cl.
*G06F 17/15* (2006.01)
*G06K 9/00* (2006.01)
*G06F 7/02* (2006.01)

(52) U.S. Cl.
CPC ................ *G06F 17/15* (2013.01); *G06F 7/02* (2013.01); *G06K 9/0055* (2013.01)

(58) Field of Classification Search
None
See application file for complete search history.

(56) References Cited

U.S. PATENT DOCUMENTS 9,191,260 B1* 11/2015 Grund ..................... H04L 7/042
2008/0065712 A1* 3/2008 Bickel .................... G01D 4/002
708/422

(Continued)

FOREIGN PATENT DOCUMENTS

WO 98/27543 6/1998

OTHER PUBLICATIONS

Bachu R.G., et al. "Separation of Voiced and Unvoiced Using Zero Crossing Rate and Energy of the Speech Signal", ASEE, Dec. 2, 2008, XP055247209.

(Continued)

*Primary Examiner* — David H Malzahn
(74) *Attorney, Agent, or Firm* — Dicke, Billig & Czaja, PLLC

(57) ABSTRACT

An apparatus for determining a similarity information on the basis of one or more input signals is configured to determine a zero crossing information describing a number of zero crossings in a respective portion for a plurality of portions of at least one of the one or more input signals. The apparatus is configured to perform a comparison on the basis of the zero crossing information, in order to determine the similarity information. A method for determining a similarity (Continued)

information and a computer program are also described. Moreover, an apparatus for determining an autocorrelation information and an apparatus for determining a cross-correlation information are based on similar considerations.

19 Claims, 8 Drawing Sheets

(56) References Cited

U.S. PATENT DOCUMENTS

| | | | |
|---|---|---|---|
| 2008/0281895 A1 | 11/2008 | McKinney et al. | |
| 2009/0296860 A1 | 12/2009 | Chester et al. | |
| 2012/0250830 A1 | 10/2012 | Lam et al. | |
| 2016/0034422 A1* | 2/2016 | Brandt | G01N 29/4436 708/424 |
| 2019/0095398 A1* | 3/2019 | Kratz | G06K 9/00503 |

OTHER PUBLICATIONS

Justin Lee, et al. "Acoustic Hazard Detection for Pedestrians with Obscured Hearing", IEEE Transactions on Intelligent Transportation Systems, vol. 12, No. 4, Dec. 2011, pp. 1640-1649, WP011379353.
Lie Lu, et al. "A Robust Audio Classification and Segmentation Method", Proceedings/ACM Multimedia 2001, 9th ACM International Conference on Multimedia, Canada, Sep. 30-Oct. 5, 2001, pp. 203-211, XP058310408.
Robert Gubka, et al. "A Comparison of Audio Features for Elementary Sound Based Audio Classification", Digital Technologies (DT), 2013, International Conference on IEEE, May 29, 2013, pp. 14-17, XP032441653.

\* cited by examiner

| Fig. 3 |
|---|
| Fig. 3A \| Fig. 3B |

APPARATUS FOR DETERMINING A SIMILARITY INFORMATION, METHOD FOR DETERMINING A SIMILARITY INFORMATION, APPARATUS FOR DETERMINING AN AUTOCORRELATION INFORMATION, APPARATUS FOR DETERMINING A CROSS-CORRELATION INFORMATION AND COMPUTER PROGRAM

CROSS-REFERENCES TO RELATED APPLICATIONS

This application is a continuation of copending International Application No. PCT/EP2017/062044, filed May 18, 2017, which is incorporated herein by reference in its entirety, and additionally claims priority from European Applications Nos. EP 16 170 744.3, filed May 20, 2016, and EP 16 199 181.5, filed Nov. 16, 2016, all of which are incorporated herein by reference in their entirety.

An embodiment according to the present invention is related to an apparatus for determining a similarity information on the basis of one or more input signals.

Another embodiment according to the invention is related to a method for determining a similarity information on the basis of one or more input signals.

An embodiment according to the invention is related to a computer program for performing said method.

Another embodiment according to the invention is related to an apparatus for determining an autocorrelation information.

Another embodiment according to the invention is related to an apparatus for determining a cross-correlation information.

Some embodiments are related to a highly-robust correlation method with low computational complexity.

BACKGROUND OF THE INVENTION

Many technical applications, for example in the field of audio processing, video processing or signal processing, involve obtaining a similarity information on the basis of one or more input signals. For example, it is sometimes desirable to compare two time-shifted sections of a single input signal, for example, in order to obtain an information about a periodicity of the signal input signal. Such a concept may be used to prepare audio processing (audio manipulation) operations or to determine the characteristics of an audio signal. For example, a fundamental frequency may be extracted from an audio signal using this concept. Also, the information about the similarity between different portions of the same audio signal can be used in situations in which a temporal extension or a temporal shortening of the audio signal is desired.

On the other hand, it may also be desirable to compare two different input signals and to obtain the information about the similarity of the input signals. For example, a similarity information may be obtained without applying a time shift to one of the input signals, or for a single time shift between the input signals, or for multiple values of the time shift of the input signals. By comparing two input signals, which may, for example, be audio signals, it may be possible to classify at least one of the audio signals. Alternatively, it may be possible to find an appropriate time for performing an overlap-and-add between the audio signals.

However, many different applications in the field of audio processing, or more generally, signal processing, are possible on the basis of a similarity information describing a similarity between two different input signals (audio signals) or a similarity between different, time-shifted portions of a single input signal (audio signal).

In embedded systems, such as digital signal processors (DSP), naturally only limited resources of memory and processor cycles are available. To be able to compute the desired algorithms in real time, it may be desirable to perform an optimization for the respective platform. These optimizations may roughly be divided into two categories. The first category includes optimizations which take advantage of the specific processor architecture. This includes, for example, approximations of trigonometric functions or use of fast FFTs or so-called single-instruction-multiple-data operations.

A second category concerns itself with, for example, an optimization of algorithms themselves. It has been found that if, for example, a cross-correlation for determining a time offset between two audio signals had to be computed, both processor cycles as well as storage space would limit the maximum detectable latency.

In the following, some conventional concepts will be described. It has been found that, for reducing memory and computational load, downsampling can be used frequently. It has been found that using downsampling by a factor of 4, ¾ (i.e., 75%) of the involved memory would be saved, or the detectable latency would be increased by a factor of four. It also has been found that these savings are offset by drawbacks. For example, there is a reduction of accuracy. Results that were sample-accurate before, are now obtainable with a maximum accuracy of n samples, when n describes the downsampling factor.

Furthermore, our robustness decreases with an increasing downsampling factor. Interferences, which may occur during an audio transmission, exceedingly deteriorate a result. This includes noise, dynamic range compression, audio encoding, limiter and filtering (for example, equalizer).

It has been found that downsampling may also be understood as follows: an audio sample is used from the audio stream at equidistant intervals and is, so to speak, a representative of its surrounding samples. A number of surrounding samples may also be referred to as a block size. In the example above, the block size n would equal 4. Every fourth sample from the audio stream would be used to function as a representative for this block. For the explanation regarding downsampling, it is assumed that an upstream downsampling filter reduces a highest occurring frequency by a factor n to satisfy the Nyquist criterion.

Moreover, it has been found that a conventional downsampling brings along significant disadvantages, for example in terms of robustness.

SUMMARY

An embodiment may have an apparatus for determining a similarity information on the basis of one or more input signals which are audio signals or video signals, wherein the apparatus is configured to determine a zero crossing information describing a number of zero crossings in a respective portion for a plurality of portions of the at least one of the one or more input signals, and wherein the apparatus is configured to perform a comparison on the basis of the zero crossing information, in order to determine the similarity information describing a similarity between different parts or sections of a single input signal or between different parts or sections of two signals to be compared; wherein the apparatus is configured to determine two or more representative values per signal block for a plurality of signal blocks, wherein the two or more representative values describe features of the signal blocks, and wherein the two or more representative values include a zero crossing value which is a zero crossing information; and wherein the apparatus is configured to determine a spectral flatness measure as one of the two representative values which are determined per signal block, and/or wherein the apparatus is configured to determine spectral flux values as one of the two representative values which are determined per signal block, wherein the spectral flux values describe, in the form of a single quantitative value, a change between spectra of two respective successive signal blocks; wherein the apparatus is configured to perform the comparison on the basis of the two or more representative values, in order to determine the similarity information, wherein the apparatus is configured to perform a first comparison on the basis of a sequence of representative values of a first type for a plurality of signal blocks, and to perform a second comparison on the basis of a sequence of representative values of a second type for the plurality of signal blocks, wherein the apparatus is configured to compare a first zero crossing value sequence, which includes a plurality of zero crossing values, and a second zero crossing value sequence, which includes a plurality of zero crossing values, to obtain a similarity information describing a similarity between a first signal section and a second signal section, wherein the first zero crossing value sequence corresponds to the first signal section, and wherein the second zero crossing value sequence corresponds to the second signal section, and wherein the zero crossing values constitute the zero crossing information; wherein the apparatus is configured to compare a result of the first comparison and a result of the second comparison, in order to obtain a reliability information; wherein the apparatus is configured to receive one or more audio signals or one or more video signals as the one or more input signals, and to determine the zero crossing information on the basis of the one or more audio signals or on the basis of the one or more video signals.

Another embodiment may have a method for determining a similarity information on the basis of one or more input signals which are audio signals or video signals, wherein the method includes determining a zero crossing information describing a number of zero crossings in a respective portion for a plurality of portions of the at least one of the one or more input signals, and wherein the method includes performing a comparison on the basis of the zero crossing information, in order to determine the similarity information describing a similarity between different parts or sections of a single input signal or between different parts or sections of two signals to be compared; wherein the method includes determining two or more representative values per signal block for a plurality of signal blocks, wherein the two or more representative values describe features of the signal blocks, and wherein the two or more representative values includes a zero crossing value which is a zero crossing information; and wherein the method includes determining spectral flatness measures as one of the two or more representative values which are determined per signal block, and/or wherein the method includes determining spectral flux values as one of the two or more representative values which are determined per signal block, wherein the spectral flux values describe, in the form of a single quantitative value, a change between spectra of two respective successive signal blocks; wherein the method includes performing the comparison on the basis of the two or more representative values, in order to determine the similarity information, wherein a first comparison is performed on the basis of a sequence of representative values of a first type for a plurality of signal blocks, and wherein a second comparison is performed on the basis of a sequence of representative values of a second type for the plurality of signal blocks, wherein a first zero crossing value sequence, which includes a plurality of zero crossing values, and a second zero crossing value sequence, which includes a plurality of zero crossing values, are compared, to obtain a similarity information describing a similarity between a first signal section and a second signal section, wherein the first zero crossing value sequence corresponds to the first signal section, and wherein the second zero crossing value sequence corresponds to the second signal section, and wherein the zero crossing values constitute the zero crossing information, wherein a result of the first comparison and a result of the second comparison is compared, in order to obtain a reliability information; wherein the method includes receiving one or more audio signals or one or more video signals as the one or more input signals, and determining the zero crossing information on the basis of the one or more audio signals or on the basis of the one or more video signals.

Another embodiment may have a non-transitory digital storage medium having a computer program stored thereon to perform the method for determining a similarity information on the basis of one or more input signals which are audio signals or video signals, wherein the method includes determining a zero crossing information describing a number of zero crossings in a respective portion for a plurality of portions of the at least one of the one or more input signals, and wherein the method includes performing a comparison on the basis of the zero crossing information, in order to determine the similarity information describing a similarity between different parts or sections of a single input signal or between different parts or sections of two signals to be compared; wherein the method includes determining two or more representative values per signal block for a plurality of signal blocks, wherein the two or more representative values describe features of the signal blocks, and wherein the two or more representative values includes a zero crossing value which is a zero crossing information; and wherein the method includes determining spectral flatness measures as one of the two or more representative values which are determined per signal block, and/or wherein the method includes determining spectral flux values as one of the two or more representative values which are determined per signal block, wherein the spectral flux values describe, in the form of a single quantitative value, a includes between spectra of two respective successive signal blocks; wherein the method includes performing the comparison on the basis of the two or more representative values, in order to determine the similarity information, wherein a first comparison is performed on the basis of a sequence of representative values of a first type for a plurality of signal blocks, and wherein a second comparison is performed on the basis of a sequence of representative values of a second type for the plurality of signal blocks, wherein a first zero crossing value sequence, which includes a plurality of zero crossing values, and a second zero crossing value sequence, which includes a plurality of zero crossing values, are compared, to obtain a similarity information describing a similarity between a first signal section and a second signal section, wherein the first zero crossing value sequence corresponds to the first signal section, and wherein the second zero crossing value sequence corresponds to the second signal section, and wherein the zero crossing values constitute the zero crossing information, wherein a result of the first comparison and a result of the second comparison is compared, in order to obtain a reliability information; wherein the method includes receiving one or more audio signals or one or more video signals as the one or more input signals, and determining the zero crossing information on the basis of the one or more audio signals or on the basis of the one or more video signals, when said computer program is run by a computer.

An embodiment according to the invention creates an apparatus for determining a similarity information on the basis of one or more input signals. The apparatus is configured to determine a zero crossing information describing a number of zero crossings in a respective portion for a plurality of portions of at least one of the one or more input audio signals. The apparatus is configured to perform a comparison on the basis of the zero crossing information in order to determine the similarity information.

This embodiment is based on the finding that a zero crossing information, which describes a number of zero crossings in a respective portion for a plurality of portions is a very robust quantity, which can be computed with moderate computational effort, but still allows for a reliable determination of a similarity information describing a similarity between different parts (or sections) of a single input signal or between different parts (or sections) of two input signals to be compared. The zero crossing information can be obtained, for example, by counting a number of zero crossings, and the zero crossing information is not severely modified by a variety of processing operations which may be applied to one or more of the input signals. Also, the zero crossing information may take the form of a sequence of single integer numbers, which may be (individually) associated with subsequent portions of the one or more input signals. Thus, by providing, for example, a single zero crossing information value (or, alternatively, two zero crossing information values) per portion of the one or more input signals, wherein each portion of the one or more input signals may comprise a plurality of samples of the one or more input signals, the amount of information may be significantly reduced, and the zero crossing information (zero crossing value) may serve as a "representative" of a respective portion of the one or more input signals. Consequently, comparing values of the zero crossing information, or sets or sequences of values of the zero crossing information, is typically computationally much more efficient than comparing entire sections of the one or more input signals. Thus, performing the comparison on the basis of the zero crossing information, in order to determine the similarity information, is computationally efficient but still provides a meaningful information about the similarity of the different sections of the one or more input signals (wherein said sections typically each comprise a plurality of portions of the at least one or more input signals, and are consequently each mapped on a plurality of values of the zero crossing information).

In an embodiment, the apparatus is configured to determine, as the zero crossing information, a total number of zero crossings, or a number of a rising zero crossings, or a number of falling zero crossings for a plurality of portions of the one or more input signals. It has been found that the total number of zero crossings, the number of rising zero crossings, and the number of falling zero crossings are all meaningful information, which can be used individually or in combination to "represent" respective portions of the one or more input signals. Also, it should be noted that a number of zero crossings can be computed easily by counting how often a sign of the one or more input signals changes from positive to negative and/or vice versa.

In an embodiment, the apparatus is configured to determine, as the zero crossing information, a zero crossing rate for a plurality of portions of at least one of the one or more input signals. It has been found that a zero crossing rate is a particular meaningful information. For example, a zero crossing rate can even consider a variation of the length of the portions of the input audio signals. On the other hand, using a zero crossing rate, it is even possible to compare signals which are sampled at different sampling rates (for example, if the product of down-sampling factor and sample rate provides the same result for both signals, which means, for example, that representative values are associated with same time units). Thus, it has been found that the zero crossing rate value is a very meaningful representative of a respective portion of one or more of the input signals.

In an embodiment, the apparatus is configured to determine the zero crossing information such that at least one zero crossing value is associated with each portion of a plurality of portions of at least one of the one or more input signals. Thus, there is a reliable representation of a section of the at least one of the one or more input signals, wherein said section typically comprises a plurality of portions.

In an embodiment, the apparatus configured to determine a first zero crossing value sequence for a first signal section, wherein the first signal section comprises a plurality of signal blocks (or signal "portions"), and wherein the first zero crossing value sequence comprises one zero crossing value (or, in some cases, more than one zero crossing values) associated with each of the signal blocks (or signal portions) of the first signal section. Furthermore, the apparatus is advantageously configured to determine a second zero crossing value sequence for a second signal section, wherein the second signal section comprises a plurality of signal blocks (or signal portions), and wherein the second zero crossing value sequence comprises one zero crossing value (or, in some cases, more than one zero crossing values) associated with each of the signal blocks (or signal portions) of the second signal section. Thus, it is possible to compare the first zero crossing value sequence and the second zero crossing value sequence to determine the similarity information. Comparing zero crossing value sequences provides a very meaningful result since each zero crossing value sequence comprises a plurality of "representative values" representing the respective signal section. Accordingly, by evaluating zero crossing value sequences in the comparison, a reliability can be increased.

In an embodiment, the apparatus is configured to compare a first zero crossing value sequence, which comprises a plurality of zero crossing values, and a second zero crossing value sequence, which comprises a plurality of zero crossing values, to obtain a similarity information describing a similarity between a first signal section and a second signal section, wherein the first zero crossing value sequence corresponds to the first signal section, and wherein the second zero crossing value sequence corresponds to the second signal section, and wherein the zero crossing values constitute the zero crossing information. By comparing the first zero crossing value sequence and the second zero crossing value sequence, it is possible to obtain a meaningful comparison result. Also, the first zero crossing value sequence typically comprises much less individual values than the first signal section, which is represented by the first zero crossing value sequence, and the second zero crossing value sequence typically comprises much less individual values than the second signal section which is represented by the second zero crossing value sequence. In some embodiments, the number of individual values of the first zero crossing value sequence may be smaller, at least by a factor of 10, than the number of individual (sample) values of the first signal section. The same relationship may also hold for the number of individual values of the second zero crossing value sequence and the number of individual (sample) values of the second signal section. Thus, the comparison between the first and second zero crossing value sequences can be performed in a very efficient manner when compared with a comparison between sample values of the first and second signal sections. Furthermore, it should be noted that the zero crossing value sequences can be compared by any of the conventional algorithms which are well-suited for the comparison of sequences of values, which allows for a flexible implementation of the apparatus.

In an embodiment, the apparatus is configured to compute a correlation value using the first zero crossing value sequence and the second zero crossing value sequence, to obtain the similarity information. Alternatively, the apparatus may be configured to compute an average magnitude difference value using the first zero crossing value sequence and the second zero crossing value sequence, to obtain the similarity information. As another alternative, the apparatus may be configured to compute a norm of a difference between the first zero crossing value sequence and the second zero crossing value sequence to obtain the similarity information. As yet another alternative, the apparatus may be configured to compute an Euclidean distance between the first zero crossing value sequence and the second zero crossing value sequence, to obtain the similarity information. It has been found that the above mentioned computationally efficient concepts for the determination of the similarity information result in good comparison results.

In an embodiment, the apparatus may be configured to compute a plurality of difference measure values between the first zero crossing value sequence, or a portion thereof, and a plurality of time-shifted versions of the second zero crossing value sequence, or time-shifted portions thereof, to obtain an information about a time shift which provides a maximum similarity between the first zero crossing value sequence, or a portion thereof, and a time-shifted version of the second zero crossing value sequence, or a portion thereof. Accordingly, it is possible to determine which temporal alignment between the first signal section, which is represented by the first zero crossing value sequence, and the second signal section, which is represented by the second zero crossing value sequence, brings along a maximum similarity. Consequently, it is possible to obtain an information which is equivalent to an autocorrelation information, if the first signal section and the second signal section are taken from a single input signal, or to obtain an information which is equivalent to a cross-correlation information if the first signal section and the second signal section are taken from different input signals. The autocorrelation information or cross-correlation information is consequently obtained for different autocorrelation lag values or cross-correlation lag values, wherein the auto correlation lag values or the cross-correlation lag values correspond to the respective time shifts of the time-shifted version of the second zero crossing value sequence (or of the time-shifted portion thereof). Thus, the zero crossing value sequences can actually be used to obtain result values of an autocorrelation function or of a cross-correlation function for different autocorrelation lag values or cross-correlation lag values.

In an embodiment, the apparatus is configured to compute a correlation function using the first zero crossing value sequence and the second zero crossing value sequence, to obtain information about a time shift which provides a maximum similarity between the first zero crossing value sequence, or a portion thereof, and a time-shifted version of the second zero crossing value sequence, or a portion thereof. Alternatively, the apparatus may be configured to compute an average magnitude difference function using the first zero crossing value sequence and the second zero crossing value sequence, to compare a portion of the first zero crossing value sequence and time-shifted portions of the second zero crossing value sequence, and to obtain information about a time-shift which provides for a maximum similarity between the first zero crossing value sequence, or a portion thereof, and a time-shifted version of the second zero crossing value sequence, or a portion thereof. Accordingly, it is possible, in a reliable and efficient manner, to determine for which time shift signal sections underlying the first zero crossing value sequence and the second zero crossing value sequence comprise a maximum similarity. Also, it may be possible to identify a periodicity of the signal sections underlying the first zero crossing value sequence and/or the second zero crossing value sequence with moderate effort.

In an embodiment, the apparatus is configured to compute a correlation function using the first zero crossing value sequence and the second zero crossing value sequence, to obtain information about a time shift which provides a maximum similarity between the first zero crossing value sequence, or a portion thereof, and a time-shifted version of the second zero crossing value sequence, or a portion thereof. Alternatively, the apparatus may be configured to compute an average magnitude difference function using the first zero crossing value sequence and the second zero crossing value sequence, to compare a portion of the first zero crossing value sequence and time-shifted portions of the second zero crossing value sequence, and to obtain information about the time shift which provides for a maximum similarity between the first zero crossing value sequence, or a portion thereof, and a time-shifted version of the second zero crossing value sequence, or a portion thereof. It has been found that the computation of a correlation function (which typically describes correlation values for different time shifts of the zero crossing value sequences) constitutes an efficient method for determining an information about time shifts which provides a maximum similarity between the first zero crossing value sequence (or a portion thereof) and a time-shifted version of the second zero crossing value sequence (or a portion thereof), which, in turn, allows to conclude to an information about a time shift which provides a maximum similarity between the first signal section and (a time-shifted version of) the second signal section. Similarly, the computation of an average magnitude difference function, which typically describes an average magnitude difference between the first zero crossing value sequence and the second zero crossing value sequence for different time shifts, allows to obtain information about a time shift which provides for a maximum similarity between the first zero crossing value sequence (or a portion thereof) and a time-shifted version of the second zero crossing value sequence (or a portion thereof). This information in turn allows to conclude to an information about a time shift which provides for a maximum similarity between the first signal section and the second signal section.

Thus, it has been found that the first zero crossing value sequence and the second zero crossing value sequence are well-suited for computing a correlation function or an average magnitude difference function on the basis thereof.

In an embodiment, the apparatus is configured to remove a constant component from the first zero crossing value sequence and from the second zero crossing value sequence before comparing the first zero crossing value sequence and the second zero crossing value sequence. It has been found that removing a constant component (for example, an average value, or the like) from the first and second zero crossing value sequences makes it easier to evaluate and compare the first zero crossing value sequence and the second zero crossing value sequence.

In an embodiment the apparatus is configured to remove a constant component (for example, a "DC value" or an average value) from the one or more input signals, and/or to apply a high-pass filtering to the one or more input signals before determining the zero crossing information. It has been found that removing such a "constant component" ensures that the zero crossing information is obtained with good or even with maximum accuracy.

In an embodiment, the apparatus is configured to determine two or more representative values per signal block for a plurality of signal blocks, wherein the two or more representative values describe features of the signal block, and wherein the two or more representative values comprise a zero crossing value (which is a zero crossing information). In this case, the apparatus is configured to perform the comparison on the basis of the two or more representative values per signal block, in order to determine the similarity information. This embodiment is based on the finding that reliability of the concept can be improved if the zero crossing value (which is considered as being "zero crossing information") is supplemented by another representative quantity (value) which describes another feature of the signal blocks.

In an embodiment, the representative values comprise, per signal block, a "positive zero crossing value" describing a number of rising zero crossings in a respective signal block and a "negative zero crossing value" describing a number of falling zero crossings in a respective signal block. By using such representative values, a reliability check can be performed. In particular, it can be checked whether rising zero crossings or falling zero crossings have been missed, because the number of falling zero crossings and the number of rising zero crossings should be very similar.

In an embodiment, the apparatus is configured to perform a first comparison on the basis of a sequence of representative values of a first type for a plurality of signal blocks and to perform a second comparison on the basis of a sequence of the representative values of the second type for the plurality or signal blocks. In this case, the apparatus is configured to compare the result of the first comparison and the result of the second comparison, in order to obtain a reliability information. Thus, by using two different types of representative values, and by comparing the results obtained using the two different types of representative values, the reliability of the method can be checked. In particular, if there is a discrepancy between the results obtained using the first type of representative values which exceeds a certain (threshold) value, it can be concluded that either the first type of representative values or the second type of representative values or both types of representative values are unreliable. In this case, an alert may be generated, indicating that the comparison is unreliable.

In an embodiment, the apparatus is configured to determine one of the two representative values which are determined for a respective signal block using a frequency domain representation of the respective signal block. It has been found that using a frequency domain representation of a respective signal block in order to obtain a representative value can improve the reliability, since some types of processing and distortion only affect the time domain representation of an input signal (for example, of an audio signal) but have little impact on the frequency domain representation.

In an embodiment, the apparatus is configured to determine spectral flatness measures as one of the two representative values which are determined per signal block. It has been found that spectral flatness measures constitute a good representation for some types of input signals (for example, for audio signals).

In an embodiment, the apparatus is configured to determine spectral flatness values describing a flatness of a spectrum of a respective signal block as one of the two representative values which are determined per signal block. It has been found that spectral flatness values describing a flatness of a spectrum of a respective signal block brings along a good reliability of the similarity information.

In an embodiment, the apparatus is configured to determine spectral flux values (for example, describing how quickly the power spectrum of a signal is changing) as one of the two (or more) representative values which are determined per signal block, wherein the spectral flux values describe, in the form of a single quantitative value, a change between spectra of two respective successive signal blocks. It has been found that usage of spectral flux values allows to obtain a particularly meaningful similarity information for some types of input signals, like, for example, for audio signals.

In an embodiment, the apparatus is configured to determine linear prediction coefficients for a respective signal block as one of the two (or more) representative values which are determined per signal block. It has been found that linear prediction coefficients are also quantities which result in meaningful similarity information at least for some types of input signals (for example, for audio signals).

In an embodiment, the apparatus is configured to receive one or more audio signals or one or more video signals or one or more sensor signals as the one or more input signals. In this case, the apparatus is configured to determine the zero crossing information on the basis of the one or more audio signals or on the basis of the one or more video signals or on the basis of the one or more sensor signals. It has been found that the zero crossing rate constitutes a particularly meaningful representative quantity for portions of "technical signals" like, for example, audio signals and video signals and sensor signals. Both audio signals and video signals are typically signals which regularly change their sign, wherein a zero crossing rate has a good correlation to the audio content or video content represented by said audio signals or video signals. Also, many sensor signals have such characteristics. Thus, it should be noted that the apparatus described herein can also be applied to other technical meaningful signals like, for example, sensor signals from different types of physical sensors. As an input signal vector will be "freed" from a DC component (for example, from average value) before processing (i.e., the DC component will be removed), such signals will also have zero crossings that can be evaluated using the concept discussed herein.

As an additional remark, it should be noted that a DC component (for example, a constant component or average value) will be removed both from an input signal and from a vector of representative values in some embodiments.

In an embodiment, the apparatus is configured to use the similarity information in order to obtain an autocorrelation information regarding an audio signal or a video signal.

Alternatively, the apparatus may be configured to use the similarity information in order to obtain a cross-correlation information with respect to two audio signals or with respect to two video signals. Alternatively, the apparatus may be configured to use the similarity information in order to determine a time shift to obtain a best possible alignment between two audio signals, or to determine a time shift to obtain a best possible alignment between two video signals. It has been found that the usage of the zero crossing information as a representative value representing a portion of an input signal, provides for a computationally very efficient concept to determine an autocorrelation information or a cross-correlation information or a time shift to obtain a best possible alignment between two audio signals or between two video signals. It has been found that representing portions of the one or more input signals by zero crossing information (or zero crossing values) reduces an amount of data (i.e., a computational load) for determining an autocorrelation information, a cross-correlation information or a time shift to obtain a best possible alignment.

An embodiment according to the invention creates a method for determining a similarity information on the basis of one or more input signals. The method comprises determining a zero crossing information describing a number of zero crossings in a respective portion for a plurality of portions of at least one of the one or more input signals. The method further comprises performing a comparison on the basis of the zero crossing information, in order to determine the similarity information. This method is based on the same considerations discussed above for the respective apparatus.

Another embodiment according to the invention creates a computer program for performing this method when the computer program runs on a computer.

An embodiment according to the invention creates an apparatus for determining an autocorrelation information which describes a similarity between different sections of a single signal, which is an audio signal or a video signal. The apparatus comprises a zero crossing analyzer configured to determine, for a plurality of blocks of a signal, a zero crossing information which comprises at least one zero crossing value per block (also designated as portion) of the signal. The zero crossing values describe a number of zero crossings for a respective block (or portion) of the signal. A zero crossing value sequence comparator is configured to compare a first zero crossing value sequence of zero crossing values associated with a first signal section of the signal with a second zero crossing value sequence of zero crossing values associated with a second signal section of the signal, in order to obtain the autocorrelation information. This apparatus for determining an autocorrelation information is based on the same considerations already mentioned above.

Another embodiment according to the invention creates an apparatus for determining a cross-correlation information which describes a similarity between a first signal and a second signal, which signals are audio signals or video signals. The apparatus comprises a zero crossing analyzer configured to determine, for a plurality of blocks (or portions) of the first signal, a zero crossing information which comprises at least one zero crossing value per block of the first signal, and to determine, for a plurality of blocks of the second signal, a zero crossing information which comprises at least one zero crossing value per block of the second signal. The zero crossing values describe a number of zero crossings for a respective block of the respective signal. The apparatus also comprises a zero crossing value sequence comparator configured to compare a zero crossing value sequence of zero crossing values associated with a signal section of the first signal with a zero crossing value sequence of zero crossing values associated with a signal section of the second signal, in order to obtain the cross-correlation information. This apparatus is well-suited for obtaining a cross-correlation information on the basis of two audio signals or two video signals, wherein a computational complexity can be reduced by using the zero crossing values as representative values for blocks (or portions) of the signals.

BRIEF DESCRIPTION OF THE DRAWINGS

Embodiments of the present invention will be detailed subsequently referring to the appended drawings, in which.

DETAILED DESCRIPTION OF THE INVENTION

1. Apparatus for Determining a Similarity Information According to FIG. 1

Figure 1:
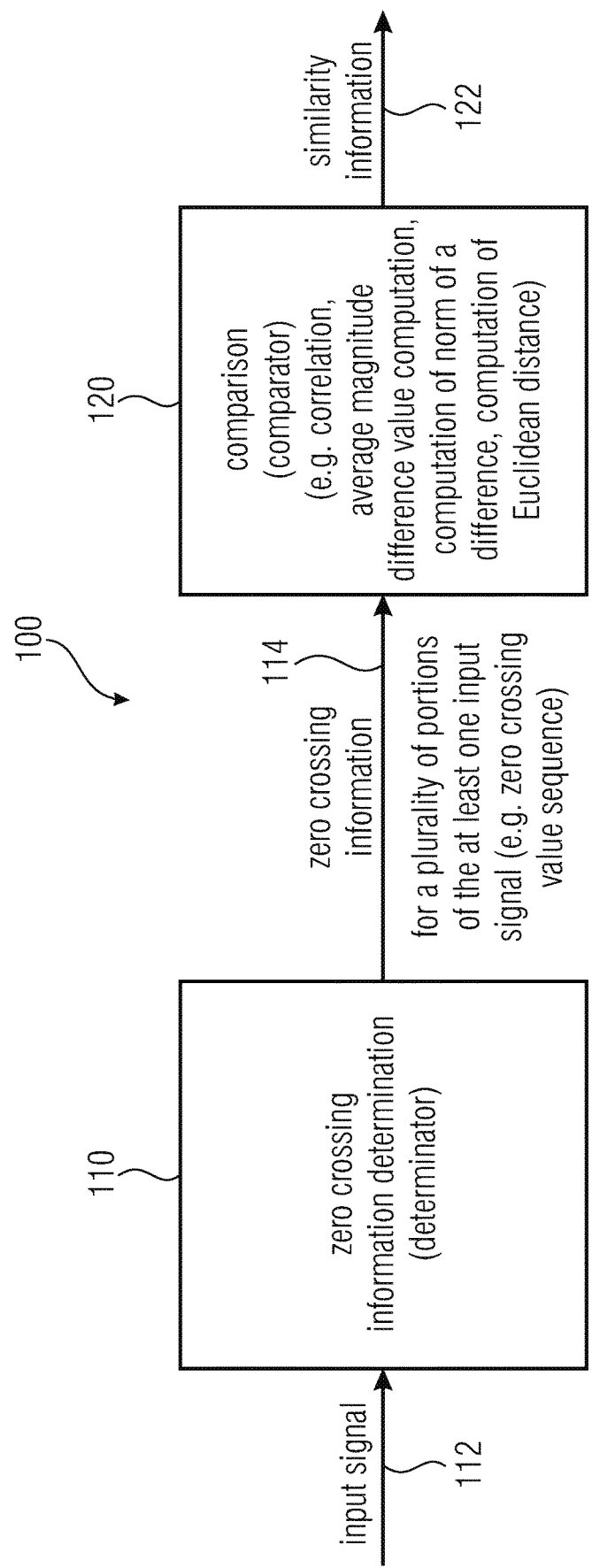
FIG. 1 shows a block schematic diagram of an apparatus for determining a similarity information according to an embodiment of the present invention.

FIG. 1 shows a block schematic diagram of an apparatus for determining a similarity information on the basis of one or more input signals, according to an embodiment of the present invention.

The apparatus according to FIG. 1 is designated in its entirety with 100.

The apparatus 100 comprises a zero crossing information determination 110, which is configured to receive at least one input signal 112 and to provide a zero crossing information 114 on the basis of the at least one input signal. For example, the zero crossing information determination (or determinator) 110 may be configured to determine the zero crossing information 114 such that the zero crossing information 114 describes a number of zero crossings in a respective portion for a plurality of portions of at least one input signal of the one or more input signals 112. The apparatus further comprises a comparison (or comparator) 120, which receives the zero crossing information 114 and which provides, on the basis thereof, a similarity information 122. For example, the comparison (or comparator) 120 may be configured to perform a comparison on the basis of the zero crossing information 114, in order to determine the similarity information 122. For example, the comparison 120 may be configured to perform a correlation operation (for example, an autocorrelation operation or a cross-correlation operation) on the basis of the zero crossing information 114. Alternatively, the comparison 120 may compute an average magnitude difference value or a norm of a difference or an Euclidian distance on the basis of different values (or sets values) of the zero crossing information. Accordingly, the similarity information 122 may be obtained.

Regarding the functionality of the apparatus 100, it can be said that the zero crossing information, which is obtained for a plurality of portions of the at least one input signal 112, is used as a "representative information", wherein, for example, each value of the zero crossing information 114 represents a portion (for example, a block of samples) of the input signal 112. Worded differently, a time-continuous or a time-discrete (sampled) portion of the input signal 112 is "mapped" onto a single value, which represents, for example, in the form of a single integer value, a number of zero crossings in said portion. Thus, a whole portion of the input signal 112, comprising multiple (e.g. 10 or more) sample values, is mapped onto a single zero crossing information value (or, in some embodiments onto two zero crossing information values, one representing a number of rising zero crossings and the other one representing the number of falling zero crossings). However, the zero crossing information has been found to be a very compact but meaningful representative information, such that the derivation of the zero crossing information 114 from the portions of the input signal 112 has the effect that only a comparatively small amount of information needs to be processed by the comparison 120.

The comparison 120 compares corresponding zero crossing values of the zero crossing information 114, to obtain the similarity information. In other words, if two sections of the input signal 112 are to be compared by the apparatus 100, then zero crossing values corresponding to these two sections are effectively compared by the comparison 120, for example using a correlation operation, an average magnitude difference value computation operation, a computation of a norm of a difference, or a computation of an Euclidean distance. Similarly, if two sections of different input signals are to be compared by the apparatus 100, then zero crossing values associated with these sections are compared by the comparison 120.

In a result, it has been found that it is computationally substantially more efficient to derive the zero crossing values (zero crossing information 114) from the input signal and then to compare the relatively small number of zero crossing values using the comparison 120 when compared to comparing a relatively large number of sample values of the sections of the one or more input signals which are to be compared.

However, it should be noted that the apparatus 100 according to FIG. 1 can be supplemented by any of the features and functionalities described herein, either individually or taken in combination.

2. Apparatus According to FIG. 2

Figure 2:
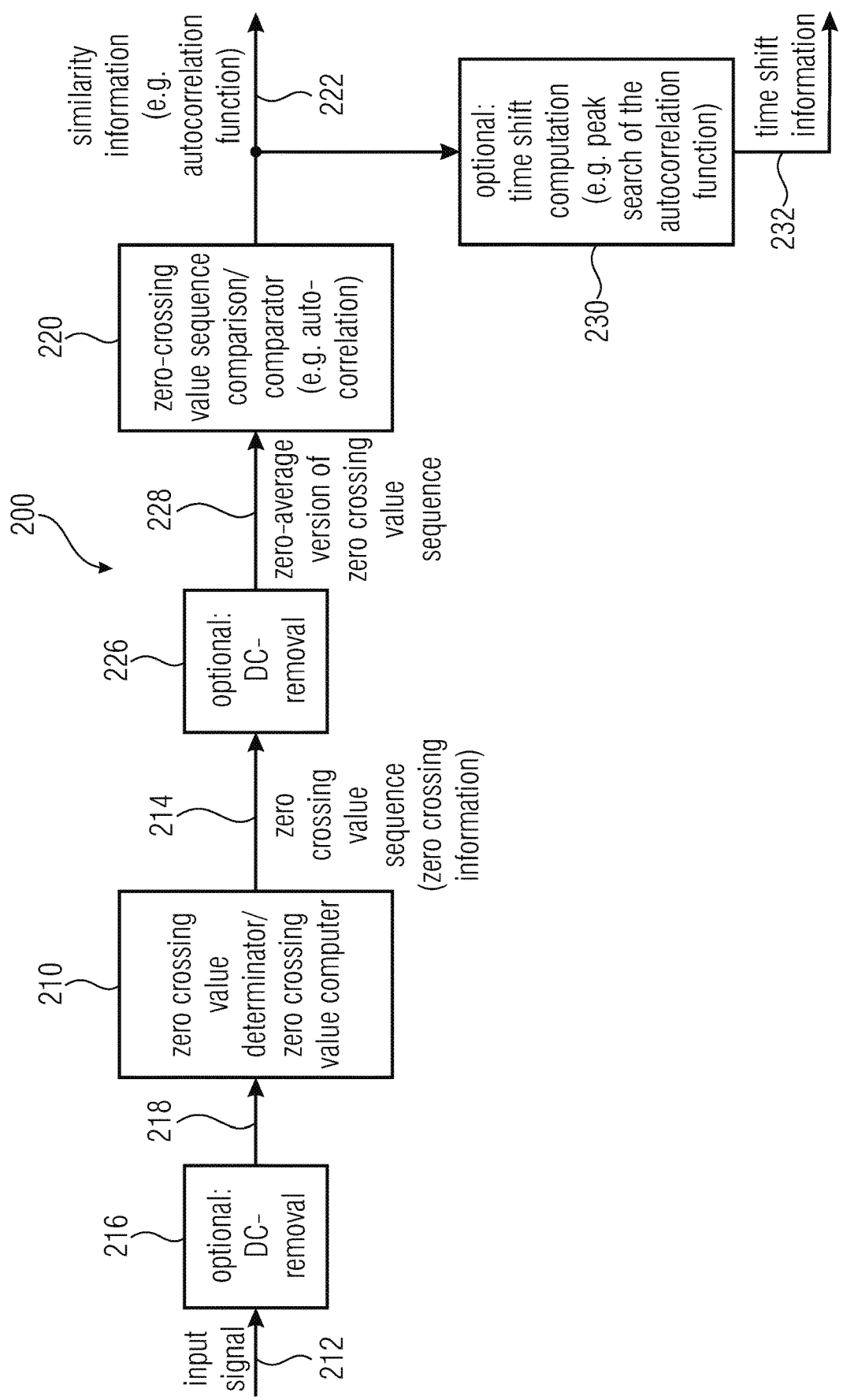
FIG. 2 shows a block schematic diagram of an apparatus for determining a similarity information according to an embodiment of the present invention.

FIG. 2 shows a block schematic diagram of an apparatus 200 for determining a similarity information on the basis of one or more input signals. The apparatus 200 is configured to receive an input signal 212, and to provide, on the basis thereof, a similarity information 222 and/or a time shift information 232. The apparatus 200 comprises a zero crossing value determinator 210, which can also be considered as a zero crossing value computer and which may, for example, take the functionality of the zero crossing information determination 110. The zero crossing value determinator 210 may, for example, receive the input signal. However, optionally, a "DC-removal" or high-pass filtering may be applied to the input signal 212 (block 216) to obtain a zero-average input signal 218. In other words, the zero crossing value determinator 210 advantageously receives a zero-average input signal, because a number of zero-crossings is most meaningful for such zero-average input signal. If it has to be assumed that the input signal 212 does not necessarily comprise a zero average, is recommended to apply the DC-removal/high-pass filtering 216 before inputting a signal into the zero crossing value determinator 210.

The zero crossing value determinator 210 provides typically one (in some embodiments even two) zero crossing values for each portion of the input signal 212 (or of the zero-average input signal 218) to be considered. Accordingly, the zero crossing value determinator 210 effectively provides a zero crossing value sequence 214, which can be considered as a zero crossing information. The zero crossing value sequence 214 may, for example, comprise a sequence of zero crossing values, each associated with a portion of the input signal 212, 218, and each describing a number of zero crossings (rising zero crossings, or falling zero crossings, or rising and falling zero crossings) in the associated portion of the input signal.

The apparatus 200 also comprises a zero crossing value sequence comparison (or comparator) 220, the functionality of which is similar to the functionality of the comparison 120. The zero crossing value sequence comparison 220 receives the zero crossing value sequence 214 provided by the zero crossing value determinator 210, or a zero-average version 228 of the zero crossing value sequence 214. For example, the zero crossing value sequence 214 may comprise one non-negative integer value for each portion of the input signal 212, 218. However, in some cases, the zero crossing value sequence comparison can be implemented easier if the zero crossing value sequence comparison 220 receives a zero-average input sequence. For this purpose, there may optionally be a DC-removal or high-pass filter 226, which receives the zero crossing value sequence 214 and provides, on the basis thereof, the zero-average version 228 of the zero crossing value sequence. For example, the DC-removal/high-pass filtering 226 may determine an average value of the values of the zero crossing value sequence 214 and subtract at an average value from the individual values of the zero crossing value sequence 214, and in order to obtain the individual values of the zero-average version 228 of the zero crossing value sequence, which is used as an input quantity for the zero-crossing value sequence comparison 220. The zero-crossing value sequence comparison 220 may use or evaluate two zero-crossing value sequences (or subsequences) which are associated with sections of the input signal 212 to be compared. For example, the zero crossing value sequence comparison 220 may be configured to compute an "autocorrelation" value on the basis of two zero crossing value sequences (or subsequences). The result of said autocorrelation value computation may constitute the similarity information 222.

However, different approaches for the comparison of zero crossing value sequences or zero crossing value subsequences may be used by the zero crossing value sequence comparison. Some of these comparison concepts may not need the DC-removal/high-pass filtering 226, while other comparison techniques (like, for example, the computation of an autocorrelation value) may benefit from the DC-removal/high-pass filtering 226.

The zero crossing value sequence comparison 220 may optionally compare multiple pairs of zero crossing value sequences or zero crossing value subsequences and thus provide a plurality of similarity information values, which represent similarities between different pairs of sections of input signals.

Optionally, the apparatus further comprises a time shift computation 230. The time shift computation 230 may, for example, be configured to receive the similarity information 222, which describes similarities between a plurality of pairs of sections of the input signal 212, 218. Moreover, the time shift computation 230 may be configured to identify a similarity information value out of the plurality of said similarity information which represents or signals a maximum similarity, to thereby conclude which pair of sections of the input signal 212, 218 comprises a maximum similarity. Accordingly, the time shift information 232 may be determined by the time shift computation 230 to describe a time shift between two sections of the input signal 212, 218 which comprise a maximum similarity. Accordingly, the apparatus 200 may effectively obtain a time shift information 232, the meaning of which is similar to a time lag for which an autocorrelation information comprises a peak.

Thus, the time shift information 232 provided by the apparatus 200 may, for example, be used to detect a periodicity within an input signal 212, 218 and represent the periodicity interval.

However, the apparatus 200 according to FIG. 2 can be supplemented by any of the features or functionalities described herein, either individually or in combination.

3. Apparatus According to FIG. 3

Figure 3A:
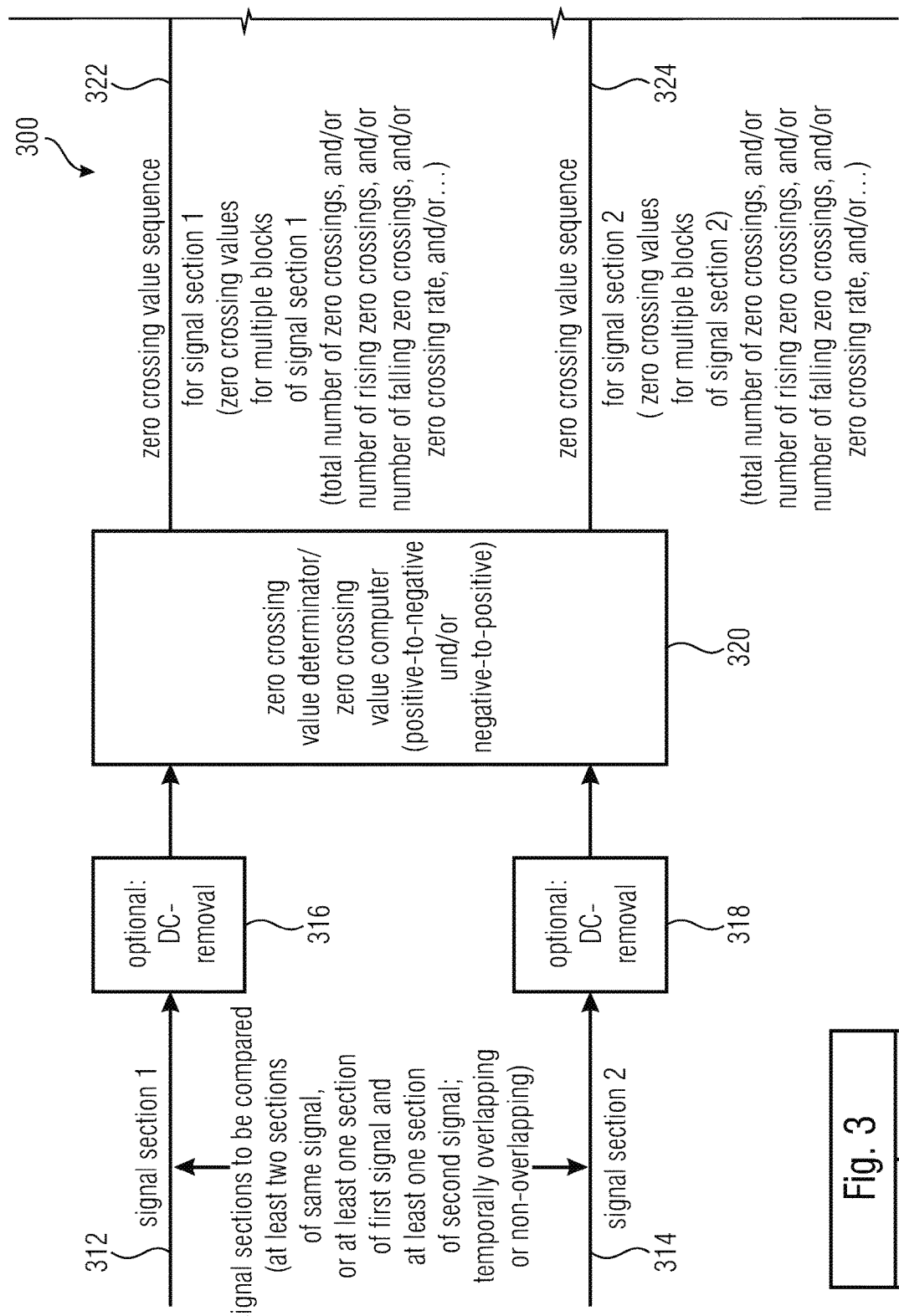
FIG. 3 (FIGS. 3A and 3B) show a block schematic diagram of an apparatus for determining a similarity information according to another embodiment of the present invention.
Figure 3B:
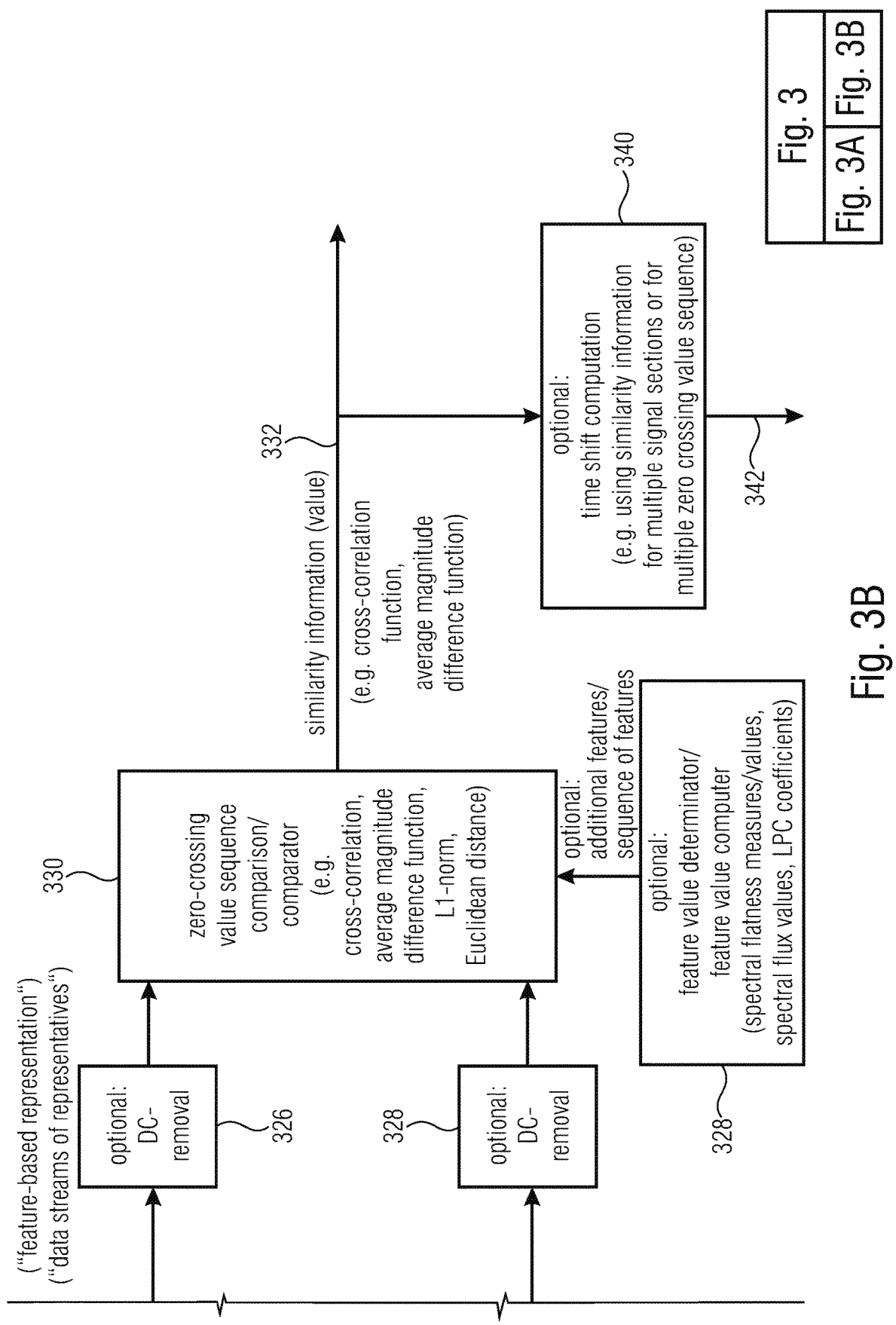

FIG. 3 (FIG. 3A and FIG. 3B) show a block schematic diagram of an apparatus 300 for determining a similarity information. The apparatus 300 is configured to receive the first signal section ("signal section 1") 312 and a second signal section ("signal section 2") 314. The first signal section 312 and the second signal section 314 are signal sections to be compared and may be two signal sections of a same signal. Alternatively, the first signal section 312 may be a section of a first signal and the second signal section 314 may be a signal section of a second signal. The signal sections 312, 314 may be temporally overlapping or temporally non-overlapping. Optionally, a first DC-removal or high-pass filtering 316 may be applied to the first signal section. Similarly, a DC-removal or high-pass filtering 318 may optionally be applied to the second signal section 314. The functionality of the DC-removal/high-pass filtering 316, 318 is comparable to the functionality of the DC-removal/high-pass filtering 216.

The apparatus 300 also comprises a zero crossing value determinator (also designated as zero crossing value computer) 320, which is configured to receive the first signal section 312 and the second signal section 314, or the zero-average versions thereof provided by the DC-removals 316, 318. The zero crossing value determinator may, for example, determine a number of rising zero-crossings (negative-to-positive zero crossings) or a number of falling zero crossings (positive-to-negative zero crossings) or a number of rising and falling zero crossings for each of a plurality of portions (or blocks) of the first signal section 312. Similarly, the zero crossing value determinator 320 may be configured to determine or compute a number of rising zero crossings or a number of falling zero crossings or a number of rising and falling zero crossings for each of a plurality of portions (or blocks) of the second signal section 314. Accordingly, the zero crossing value determinator may be configured to provide a zero crossing value sequence 322 for (i.e., associated with) the first signal section 312, wherein said zero crossing value sequence 322 comprises the zero crossing values associated with the portions (or blocks) of the first signal section 312 (for example, exactly one or exactly two non-negative integer values for each portion or block of the first signal section 312). Similarly, the second zero crossing value sequence 324, which is provided by the zero crossing value determinator 320 for the second signal section 314, may comprise exactly one or exactly two non-negative integer values for each portion or block of the second signal section 314 (each of the individual values representing a number of rising zero crossings, or a number of falling zero crossings, or a number of total zero crossings within a respective portion to which the respective individual value is associated).

The apparatus 300 may further comprise, optionally, a DC-removal or high-pass filtering 326, which may remove an average value from the first zero crossing value sequence 322 or which may high-pass filter the first zero crossing value sequence 322. Similarly, the apparatus may comprise a DC-removal or high-pass filtering 328, which removes an average value from the zero crossing value sequence 324 or high-pass filters the zero crossing value sequence 324.

The apparatus 300 also comprises a zero crossing value sequence comparison (or zero crossing value comparator) 330, which is configured to receive the first zero crossing value sequence 322, or a zero-average version thereof provided by the DC-removal/high-pass filter 326, and the second zero-crossing value sequence 324 or a zero-average version thereof provided by the DC-removal/high-pass filter 328. The zero crossing value sequence comparison is configured to compare the first zero crossing value sequence 222 (or the zero-average version thereof) and the second zero crossing value sequence 324 (or the zero-average version thereof), to obtain the similarity information (which may take the form of a single similarity value). For example, the zero crossing value sequence comparison 330 may be configured to compute a cross-correlation value, an average magnitude difference function value, L1-norm or an Euclidean distance on the basis of the first zero-crossing value sequence and the second zero-crossing value sequence, whereby the first zero crossing value sequence 322 is compared with the second zero crossing value sequence 324. Thus, the similarity information 332, which may, for example, be represented by a single value associated with a comparison between two zero crossing value sequences 322, 324 may be provided on the basis of the zero crossing value sequence comparison. However, the similarity information may also comprise a sequence of values, which are provided for comparisons of different pairs of zero crossing value sequences, or for comparisons of different subsequences of two zero crossing value sequences. For example, the similarity information 332 may comprise a cross-correlation value, a cross-correlation function (i.e., cross-correlation values for a plurality of cross-correlation lag values) or an average magnitude difference function value.

Optionally, the apparatus 300 may also comprise a time shift computation 340, which may, for example, receive multiple similarity information values associated with the comparison of different pairs of zero crossing value sequences or zero crossing value subsequences. For example, the time shift computation 340 may determine for which pair of zero crossing value sequences or for which pair of zero crossing value subsequences a maximum similarity occurs. In other words, the time shift computation may use similarity information for multiple signal sections or for multiple zero crossing value sequences.

Optionally, the apparatus 300 may also comprise a feature value determinator/feature value computer 350, which may be configured to determine or compute one or more additional feature values. The one or more additional feature values may each describe or represent one portion (or block) of the first signal section or of the second signal section. For example, there may be one additional feature value associated with each zero crossing value of the first zero crossing value sequence 322 and of the second zero crossing value sequence 324.

Thus, in addition to a comparison of the zero crossing value sequences, one or more additional feature value sequences may be compared in order to obtain the similarity information 332. For example, a comparison between a first zero crossing value sequence 322 and a second zero crossing value sequence 324, each comprising n values, may be computed by the zero crossing value sequence comparison 330, to obtain a first partial similarity information. In addition, a first feature value sequence and a second feature value sequence, each comprising n feature values, may be compared, to obtain a second partial comparison result. Finally, the first partial comparison result (or first partial similarity information) in the second partial comparison result (or partial similarity information) may be combined to obtain the similarity information 332. Thus, for the comparison of a certain first signal section with a certain second signal section, a zero crossing value sequence and an additional feature value sequence associated with the certain first signal section may be used in the comparison, and a second zero crossing value sequence and a second additional feature value sequence may be used in the comparison as well. Thus, the comparison result between the first zero crossing value sequence and the second zero crossing value sequence may be combined with the comparison result between the first additional feature value sequence and the second additional feature value sequence, to obtain the similarity information. Consequently, each portion or block of the first signal section is represented by two representative values, a zero crossing value and an additional feature value, and each block of the second signal section is also represented by at least two representative values, namely a zero crossing value and an additional feature value. By using two types of representatives (zero crossing value and additional feature value), the reliability of the comparison can be improved, such that the similarity information 322 can be considered as being more reliable. The similarity information 332 can be derived by various types of combination of the first partial comparison result and the second partial comparison result. For example, an average and/or weighted average of the first partial comparison result and of the second partial comparison result may be computed. Alternatively, a minimum value of the first partial comparison result and of the second partial comparison result may be used to obtain the similarity information 332. However, other linear or non-linear combination approaches can be used to derive the similarity information 332 from the first partial comparison result and the second partial comparison result.

4. Example According to FIG. 4

In the following, an example for the determination of a similarity information will be described taking a reference to FIG. 4.

Figure 4:
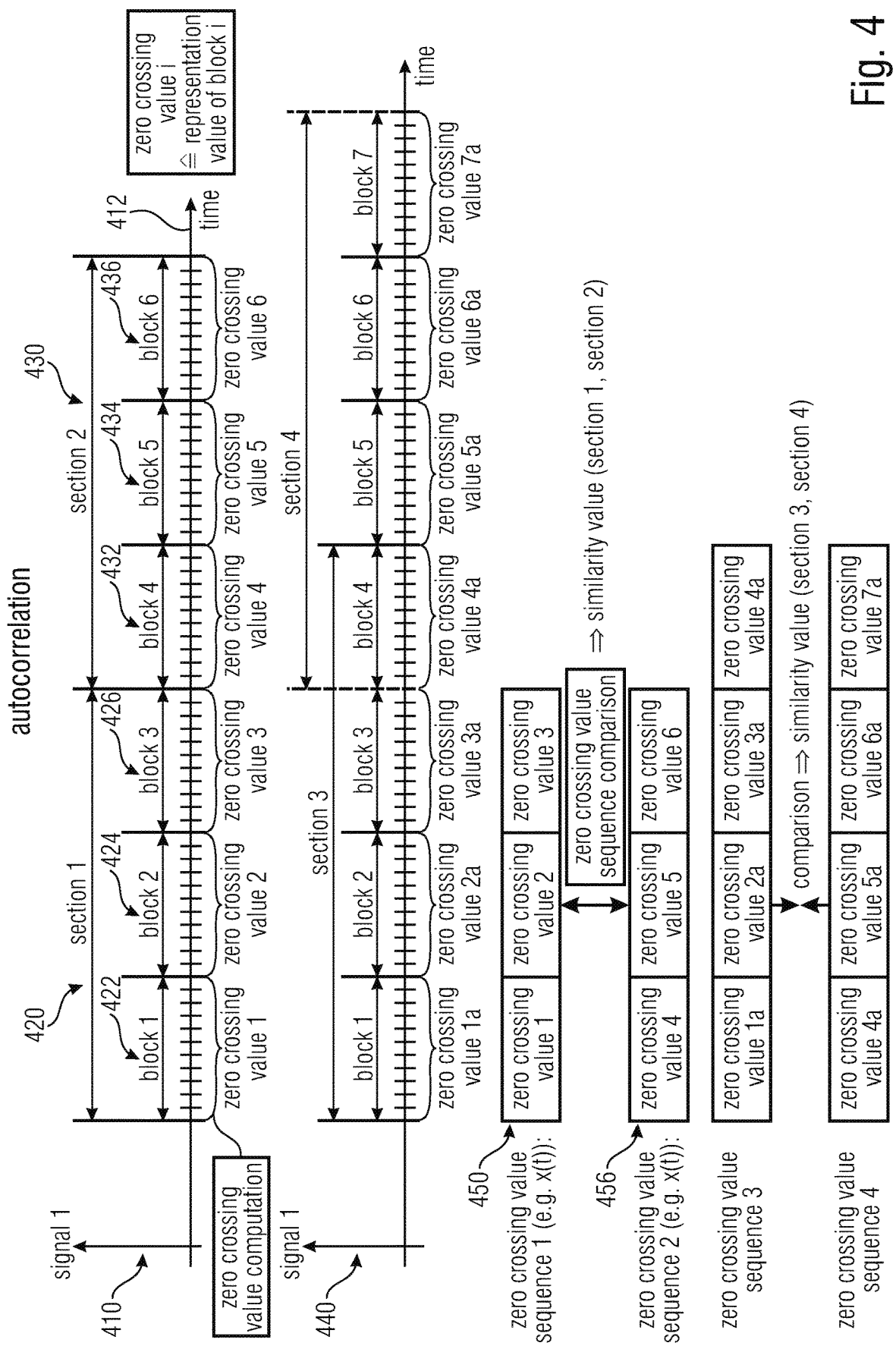
FIG. 4 shows a schematic representation of a determination of a similarity information for the case that an autocorrelation is computed.

FIG. 4 shows, in a first line 410, a representation of a first signal. An abscissa 412 describes a time. As can be seen, the signal is subdivided into two subsequent non-overlapping sections 420, 422 ("section 1", "section 2"). The first section 420 is temporally subdivided into n=3 non-overlapping blocks (also designated as portions) 422, 424, 426. Each of the blocks 422, 424, 426 comprises a set of sample values, which are indicated by vertical lines intersecting the time axis.

A first zero crossing value "zero crossing value 1" is determined or computed on the basis of the sample values of the "signal 1" which are lying temporally within the first block 422. Similarly, a second zero crossing value "zero crossing value 2" is determined or computed on the basis of the sample values which are temporally lying within the second block 424. Furthermore, a third zero crossing value "zero crossing value 3" is determined or computed on the basis of the sample values which are temporally lying within the third block 426.

Similarly, further zero crossing values ("zero crossing value 4", "zero crossing value 5", "zero crossing value 6") are computed on the basis of samples of the "signal 1" which are lying in the fourth block 432, in the fifth block 434 or in the sixth block 436. Thus, each of the zero crossing values can be considered a representation value of the respective block of signal values or signal samples for which it was computed.

Moreover, it can be said that a first zero crossing value sequence is associated with the first section 420 of the first signal (signal 1), and that the second zero crossing value sequence is associated with the second section 430 of the first signal (signal 1). For example, the first zero crossing value sequence comprises a zero crossing value associated with the first block 422, a zero crossing value associated with the second block 424 and a zero crossing value associated with the third block 426. The second zero crossing value sequence comprises a zero crossing value associated with the fourth block 432, a zero crossing value associated with the fifth block 434 and a zero crossing value associated with the sixth block 436. The first zero crossing value sequence is illustrated at reference numeral 450 and the second zero crossing value sequence is illustrated at reference numeral 456. It should be noted that the first zero crossing value sequence and the second zero crossing value sequence may correspond to the zero crossing information 114, or to the zero crossing value sequence 214, or to the first and second zero crossing value sequence 322, 324. Thus, the first zero crossing value sequence and the second zero crossing value sequence may be provided by the zero crossing information determination 110 or by the zero crossing value determinator 210, 320. Moreover, the first zero crossing value sequence and the second zero crossing value sequence may be compared by the comparison 120 or by the zero crossing value sequence comparison 220, 330. For example, the first zero crossing value sequence and the second zero crossing value sequence may be compared using a computation of a correlation. Alternatively, other concepts for the comparison of two sequences of values may be used, as described herein.

Thus, a similarity value is obtained, which represents (or describes) the similarity between the first section 420 (on which the first zero crossing value sequence is based) and the second section 430 (on which the second zero crossing value sequence is based). In other words, the similarity value represents the similarity of those sections of the input signal on which the zero crossing value sequences which have been compared are based.

As another example, a comparison of overlapping sections of the first signal (signal 1) is shown at reference numeral 440. As can be seen, a third section, comprising signal blocks or signal sections "block 1", "block 2", "block 3", and "block 4" is compared with a fourth section "section 4", which comprises signal blocks or signal portions "block 4", "block 5", "block 6" and "block 7". Similar to the case mentioned before, one zero crossing value is associated with each of said blocks "block 1" to "block 7", wherein the zero crossing values are designated with "zero crossing value 1a" to "zero crossing value 7a".

Accordingly, a third zero crossing value sequence comprises zero crossing values 1a to 4a, and a fourth zero crossing value sequence comprises zero crossing values 4a to 7a. Accordingly, the third zero crossing value sequence and the fourth zero crossing value sequence can be compared, wherein zero crossing value 1a is compared with zero crossing value 4a, wherein zero crossing value 2a is compared with zero crossing value 5a, etc. Accordingly, it is possible to compare overlapping sections (section 3 and section 4) of a single signal, wherein the sections are represented by "overlapping" zero crossing value sequences. Naturally, it is not necessary to compute those zero crossing values which are common to two (or more) zero crossing value sequences multiple times. Rather, it is naturally sufficient to compute each zero crossing value only a once and to select those subsets of the zero crossing values corresponding to the signal sections to be compared for the comparison.

5. Example According to FIG. 5

Figure 5:
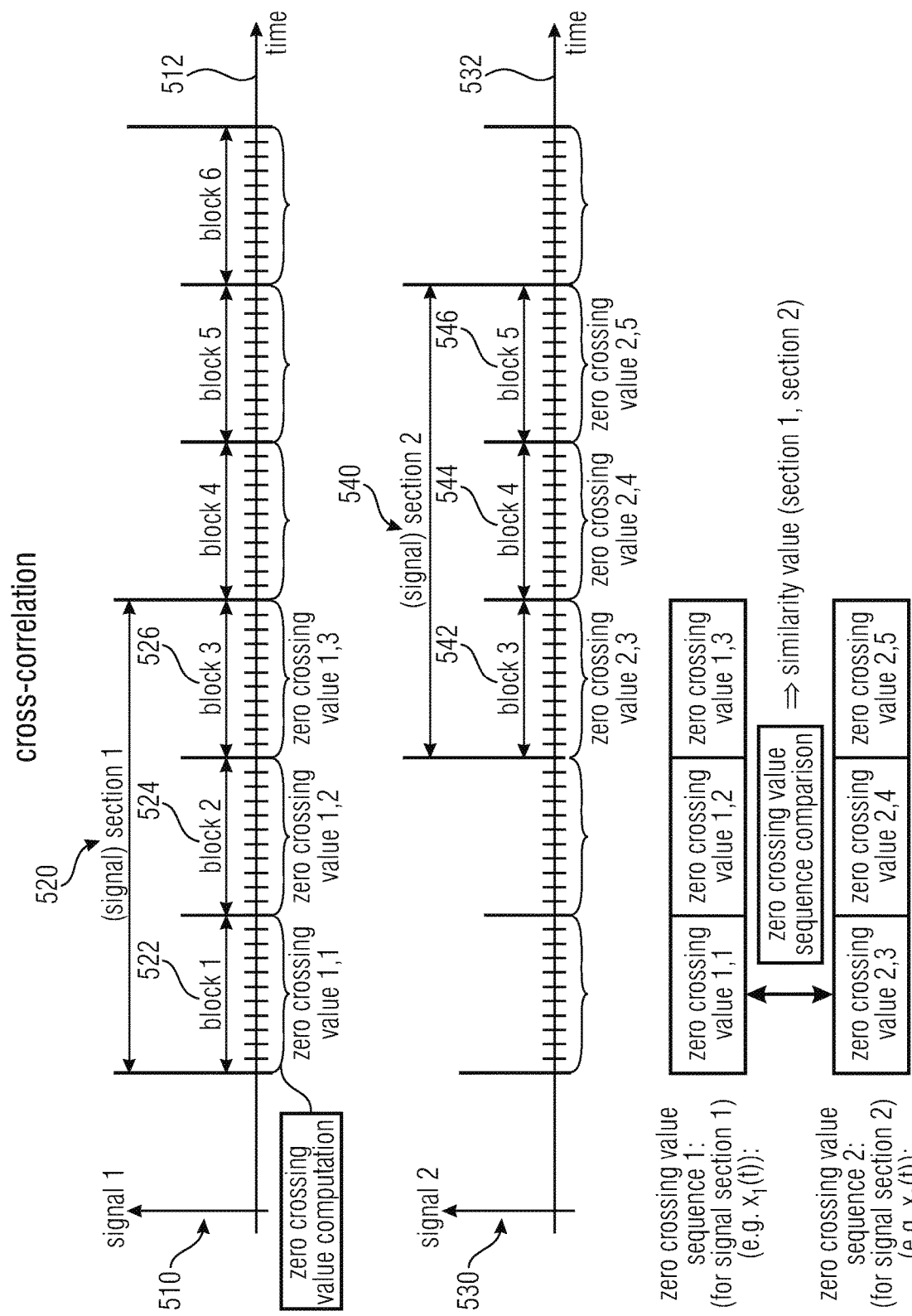
FIG. 5 shows a schematic representation of a determination of a similarity information for the case that a cross-correlation is used.

An execution of a comparison of the signals (or portions thereof) will subsequently be described taking reference to FIG. 5. The comparison may, for example, correspond to a cross-correlation, wherein blocks (or portions) of signal sections to be compared are represented by zero crossing values.

A representation at reference numeral 510 shows a section 520 of a first signal, wherein this section comprises a first block 522, a second block 524 and a third block 526, wherein the blocks 522, 524, 526 are, for example, non-overlapping, immediately subsequent time portions of the signal section 520. Each of the blocks 522, 524, 526 may comprise a number of signal samples in case that the signal is time-discrete, wherein the signal samples are represented by vertical lines crossing a time axis 512 (abscissa). A first zero crossing value of the first signal (zero crossing values 1, 1) is associated with the first block 522, a second zero crossing value (zero crossing value 1, 2) of the first signal is associated to the second block 524, and a third zero crossing value (zero crossing value 1, 3) is associated with the third block 526.

Similarly, there is a second signal, which is different from the first signal and which is represented at a reference numeral 530. An abscissa 532 describes a time. A signal section (designated herein as a "second signal section" 540) of the second signal is selected for a comparison. The second signal 540 comprises blocks 542, 544, 546, which are also designated as "zero crossing value 2, 3", "zero crossing value 2, 4" and "zero crossing value 2, 5". Thus, a first zero crossing value sequence, comprising zero crossing values "zero crossing values 1,1", "zero crossing value 1,2" and "zero crossing value 1,3" is associated with the (first) signal section 520 of the first signal which is selected for the comparison. Similarly, a second zero crossing value sequence, comprising zero crossing values "zero crossing value 2,3", "zero crossing value 2,4" and "zero crossing value 2,5" is associated with the (second) signal section 540 of the second signal, wherein said (second) section 540 has been selected for a comparison. Accordingly, the first zero crossing value sequence and the second zero crossing value sequence are compared, to obtain a similarity information describing a similarity between the first signal section 520 and the second signal section 540. Again, the blocks or portions of the first signal section 520 are represented by the individual values of the first zero crossing value sequence, and the blocks or portions of the second signal section 540 are represented by the individual values of the second zero crossing value sequence.

To further conclude, the comparison of the full signal sections 520, 540, each comprising a large number of individual sample values of the first signal and of the second signal, is replaced by a comparison of the zero crossing value sequences. However, the number of values of a zero crossing value sequence is typically much smaller than the number of signal sample values of a signal section represented by the zero crossing value sequence. For example, the number of zero crossing values needed to represent a signal section may be smaller, by a factor of 10 or even by a larger factor, than a number of signal samples of a time-discrete representation of the signal section. Thus, the comparison of zero crossing value sequences takes much less time than the comparison of signal sections represented by signal sample values.

6. Example According to FIG. 6

Figure 6:
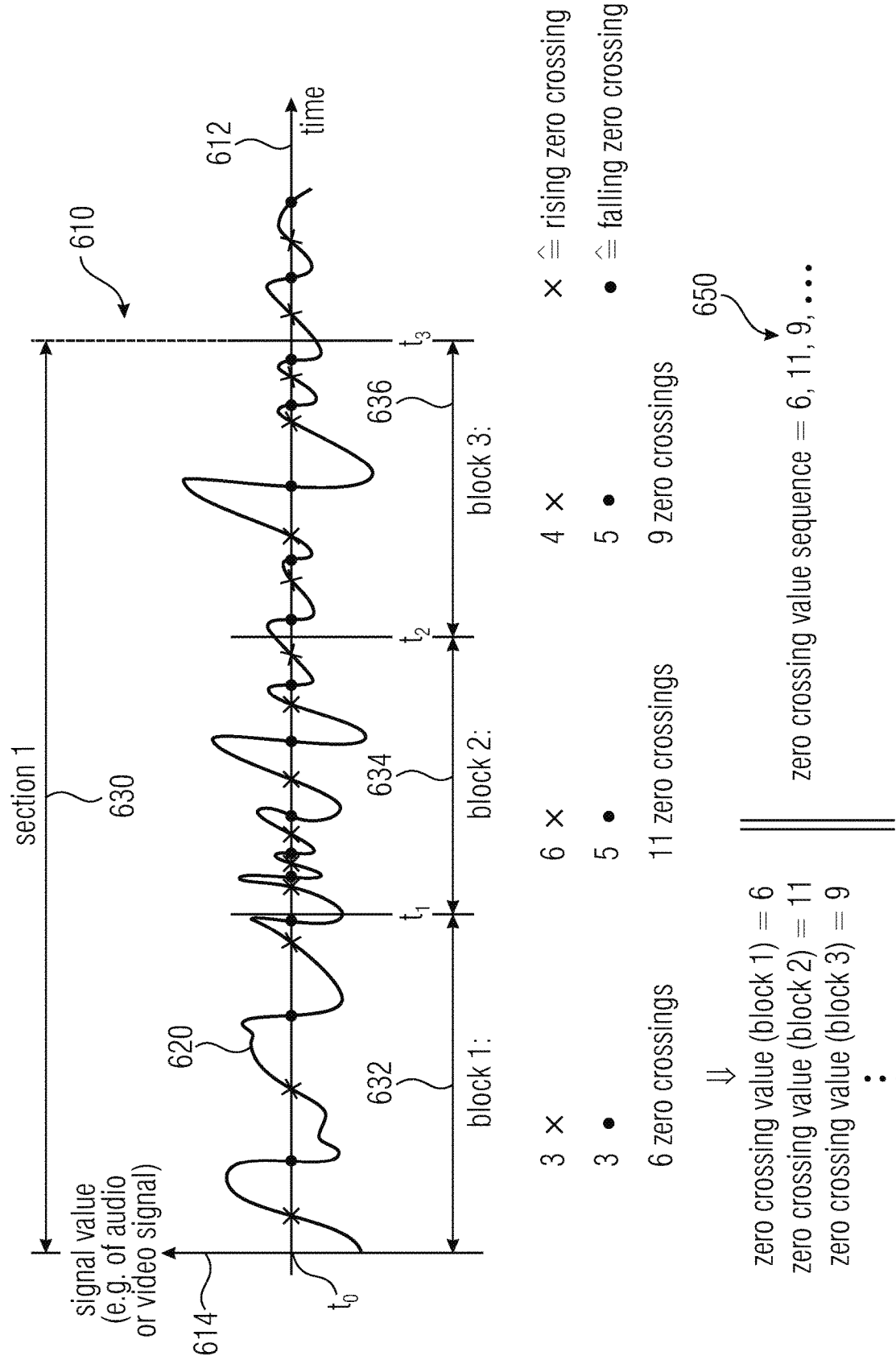
FIG. 6 shows a detailed schematic representation of a determination of a zero crossing value sequence.

FIG. 6 shows a schematic representation how to derive zero crossing values from a signal like, for example, an audio signal or a video signal.

A section of a signal is represented at reference numeral 610. An abscissa 612 describes a time, and an ordinate 614 describes signal values. A temporal evolution of the signal is described by a curve 620.

Even though the curve is shown as a time-continuous curve 620, the signal may naturally also be represented by time-discrete samples having a sufficient temporal resolution. However, a signal section 630 is defined (arbitrarily) for a comparison. This signal section 630, which is defined by a starting time $t_0$ and by an end time $t_3$ is subdivided into three temporal portions or blocks, a first block 632 starting a time $t_0$ and ending a time $t_1$, a second block 634 starting a time $t_1$ and ending a time $t_2$, and a third block 636 staring a time $t_2$ and ending a time $t_3$. As can be seen, zero crossings can easily be identified. Zero crossings are points at which a value of the signal under consideration crosses the "zero line", i.e. the ordinate 612. Rising zero crossings can be distinguished from falling zero crossings. For example, a rising zero crossing is a point at which the signal value is zero, wherein the signal value is negative shortly before said zero crossing and wherein the signal value is positive shortly after the zero crossing as can be easily determined for time-continuous signals. However, for time-discrete signals, a zero crossing may be identified if a first sample takes a negative value and an immediately subsequent sample value takes a positive value. A rising zero crossing may also be identified if a first sample value takes a negative value, an immediately following sample value takes a zero value, and another immediately following sample value takes a positive value.

The falling zero crossing is at a point where the signal value takes a zero value for the case that a signal value is positive shortly before the zero crossing and wherein a signal value is negative shortly after the zero crossing. This can easily be identified for time-continuous signals. For time-discrete signals, a falling zero crossing can be identified if it is found that a first sample value takes a positive value and an immediately following second sample value takes a negative value. Also, as a special case, a falling zero crossing can be identified if a first sample value takes a positive value, an immediately subsequent second sample value takes a zero value, and another immediately subsequent third sample value takes a negative value.

Taking reference, for example, to the first block 632, three rising zero crossings (marked by an "x") can be identified. Also, three falling zero crossings (marked by a "•") can be identified. As mentioned above, the identification is possible both for time continuous signals (for example, using an analog circuit) and for time discrete signals (for example, using a digital evaluation, as discussed before).

Taking reference to the second block 634, it can be seen that six rising zero crossings and five falling zero crossings can be identified. In the third block 636, four rising zero crossings and five falling zero crossings can be identified.

Depending on the actual implementation of the zero crossing value determinator and the zero crossing value sequence comparison, a number of rising zero crossings within the different blocks and/or a number of falling zero crossings within the individual blocks can be considered as separate features. In some embodiments, only a number of rising zero crossings in the different blocks is evaluated. In other embodiments, only the number of falling zero crossings in the individual blocks is evaluated. In some embodiments, both a number of rising zero crossings in the individual blocks and a number of falling zero crossings in the individual blocks is evaluated. However, in some other embodiments, a total number of zero crossings in the individual blocks is evaluated (in that the number of total zero crossings within the different blocks makes up the zero crossing value sequence).

An example of a zero crossing value sequence (in the form of a sequence of numbers 6, 11 and 9) is shown at reference numeral 650.

Thus, the zero crossing value sequence 6, 11, 9 may, for example, be associated with the "section 1" 630. Another section of the signal, or of another signal, may be represented by another zero crossing value sequence (for example, by a sequence 7, 12, 8). Naturally, the zero crossing value sequences may take different lengths as well.

Consequently, the comparison, which is performed by the zero crossing value sequence comparison, may be performed on the basis of zero crossing value sequences associated with different sections of a single signal, or associated with sections of different signals to be compared.

7. Method According to FIG. 7

Figure 7:
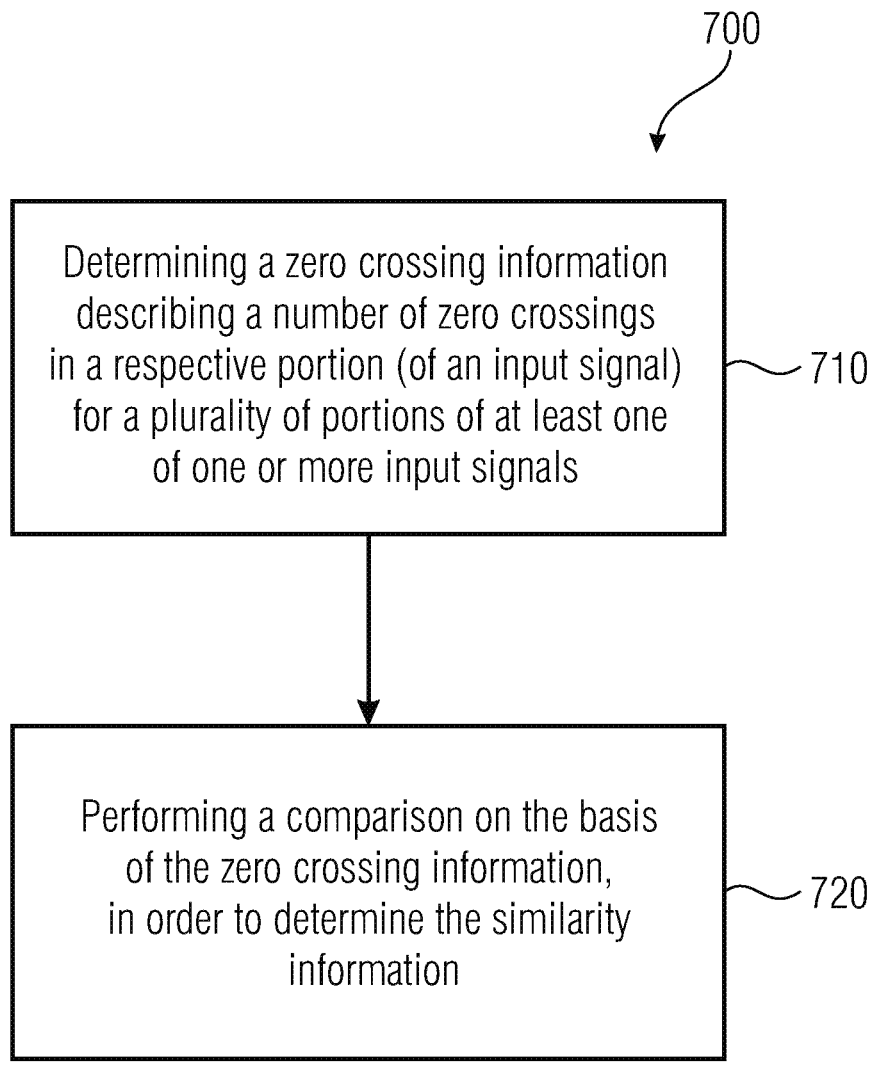
FIG. 7 shows a flowchart of a method for determining a similarity information, according to an embodiment of the present invention.

FIG. 7 shows a block schematic diagram of a method for determining a similarity information on the basis of one or more input signals. The method 700 comprises determining 710 a zero crossing information describing a number of zero crossings in a respective portion of an input signal for a plurality of portions of at least one of one or more input signals. The method 700 also comprises performing 720 a comparison on the basis of the zero crossing information, in order to determine the similarity information.

It should be noted that the method 700 is based on the same considerations discussed above with respect to the apparatuses 100, 200, 300. Also, the method 700 can be supplemented by any of the features and functionalities described herein, for example with respect to the respective apparatuses.

8. Applications

Embodiments according to the present invention can be applied in a variety of technical apparatuses. For example, the apparatuses described above can be used in a signal analyzer for analyzing an audio signal, a video signal, a sensor signal from a physical sensor, or any other electrical or optical signals. Similarly, the apparatuses described herein can be used in a signal processor for processing an audio signal, a video signal, a sensor signal from a physical sensor sensing a physical quantity, or another electrical signal or optical signal.

As an example, the apparatus described herein may be used in an audio processor for aligning audio signals. Alternatively, the apparatus described herein may be used in a pitch determination, wherein the apparatus described herein may perform an "autocorrelation"-functionality, which comprises comparing different signal sections.

However, many different applications of the apparatus described herein with an audio encoder or an audio decoder can be implemented.

9. Further Aspects and Conclusions

Embodiments according to the invention are based on the finding that a number of zero crossings (for example, defined as a change in sign) within a block has been identified as a representation value for very robust estimates. For example, a value representing said number of zero crossings within a block can represent a number of "surrounding" samples (for example, the samples of the respective block). It has been found that it is only of subordinate importance whether all changes in sign (or all zero crossings) are used, or just the changes from negative to positive (rising zero crossings) or from positive to negative (falling zero crossings). Thus, a representative (for example, a value representing the samples of a block of the input signal) includes the number of changes in sign in its block (of the input signal). For this method to function, it is advantageous that the constant component (DC component) is removed from the signal (for example, from the input signal or from multiple input signals) prior to counting (for example, counting zero-crossings). This removal of the constant component can be considered as a "DC-removal" or a "DC-filtering".

The data streams of the representatives (i.e. data streams comprising values representing the number of zero crossings in different blocks of one or more signals, like, for example, zero crossing value sequences) may be fed to a cross-correlation (for example, to the comparison 120 or to the zero crossing value sequence comparison 220, 330) to compute the latency between the streams (for example, a latency between different zero crossing value sequences). Subsequently, the results may be multiplied by a block size n (for example, representing the size of a block of an input signal in samples) to reach a real offset (for example, a time shift between two input signals in terms of samples).

For the cross-correlation to be able to provide a valid result, a constant component (for example, a "DC component") or average also should be removed from both data streams (for example, from both zero crossing value sequences). This may be performed, for example, by the DC-removal/filtering 226 or by the DC-removal/filtering 326, 328. If a total number of zero crossings is used, all values may be positive (or zero, in some exceptional cases). However, when using a series of positive values, a meaningful result cannot be gained from a correlation in some cases.

However, the method described herein is not limited to cross-correlation. It may also be used for applications that use an autocorrelation. For example, reference is made to the zero crossing value sequence comparison 220, which may, for example, make use of such an autocorrelation.

As an optional extension of the method, two representatives per block may be used. For example, one representative may be separately save (or represent) a number of changes from positive to negative (for example, a number of falling zero crossings in a block) and one may separately save (or represent) a number of changes from negative to positive (for example, rising zero crossings). If additional processing power is available for simultaneously running correlations (wherein one correlation may operate on zero crossing value sequences representing a number of rising zero crossings and wherein one correlation may operate on a zero crossing value sequence representing a number of falling zero crossings), robustness is further increased, since both results may be compared and a measure of reliability may be obtained. It should be noted that, in some cases, both values are almost identical. However, in some cases, this concept is helpful. Thus, if additional features are used, it is sometimes advantageous that the features are different, as will be described in the following.

Test results have shown that, in these methods, the block size recedes into the background with respect to robustness. Hence, the main (or sometimes the only) deciding factor is which accuracy is to be achieved for the respective application.

It should also be noted that the apparatuses and methods described herein may be used for all signal types to be correlated. The concept described herein is not limited to audio applications, even though the concept brings along a particularly advantageous results when used for audio signals.

In the following, some optional extensions will be described.

In particular, one or more further features can be used optionally in the embodiments described herein.

The method described herein may be modified and extended by using different features. For example, in audio signal processing, values computed from the signal that may be used for describing the signal are identified as features. This includes the number of zero crossings or the zero crossing rate. Both may be used equivalently in the embodiments of the invention. Worded differently, the zero crossing values mentioned herein may describe a number of zero crossings in a respective portion of an input signal or an (average) number of zero crossings per time unit in a block of the input signal.

Moreover, besides features that may be computed from the number of zero crossings (in the time domain), other features may also be computed in the time domain or in the frequency domain. Such determination of additional features or feature values is shown, for example, at reference numeral 350 in FIG. 3. For computing in the frequency domain, each block of samples may be transferred to the frequency domain by using a discrete-Fourier transform (or a different frequency domain transformation or time-domain-to-frequency-domain transformation) and the features or feature values are determined from the computed spectrum. These features include, for example, a spectral flatness measure and/or a spectral flux (or spectral flux values). Spectral flux is a measure of a change between two subsequent spectra (for example, between spectra associated with subsequent blocks of an input signal) and is computed from a vector norm (for example, L2 norm) of the difference of both spectra or from a distance measure between the two spectral vectors. Further possible features include the LPC coefficients (linear-prediction-coding coefficients).

Moreover, values obtained by downsampling the one or more input signals may be used as additional features (in addition to the zero crossing values). Apart from a simple downsampling, other representation values may be used. Examples include the energy of a block, the mean values of the samples or the crest factor. Even though these representations of the blocks do not provide reliable results when taken alone for a broad set of test data, they can supplement the zero crossing values as additional feature values.

However, it should be noted that other feature values can also be extracted from a frequency domain representation of a block (or portion) based on the one or more input signals. For example, a position of a spectral maximum could be represented by a feature value. Alternatively, a number of spectral peaks could be represented by a feature value. As another option, a spectral tilt describing how the spectrum varies over a frequency could be represented by a feature value.

These additional features or feature values may be used in a feature value sequence comparison (for example, in the feature value sequence comparison 220 or in the feature value sequence comparison 330) in that a zero crossing value sequence and a feature value sequence comprising additional feature values representing other features than zero crossing values are used in the comparison.

It should be noted that further functions may optionally be used for computing the time offset. These further functions may be used in addition to an autocorrelation or a cross-correlation, or as a replacement for the auto-correlation or cross-correlation. For determining a time offset (for example, between two input signals) a correlation function may be computed.

Alternatively, an "average magnitude difference function" (AMDF) may be determined.

In principle, a time offset may be determined by comparing a representation x(t) of the signal (or of a section of the signal) to a time-shifted representation x(t+d), wherein the variable d is the time offset. For example, $x_1(t)$ may be compared with $x_1(t+d)$ or $x_2(t+d)$, wherein $x_1$ is a first signal and $x_2$ is a second signal. The representation x may be the signal (or one of two or more signals) or a downsampled signal or a feature-based representation according to the invention described herein. The time offset corresponds to d which maximizes the similarity between x(t) and x(t+d) (or between $x_1(t)$ and $x_2(t+d)$).

The correlation may be computed by multiplying each sample from a block by each sample from the time-shifted block and by subsequently adding up all products. This corresponds to these scalar product (inner product) when considering both blocks as vectors.

Alternative similarity measures may be used, for example, the L1 norm or the Euclidean distance. When using the L1 norm, the mean value of the element-by-element difference between x(t) and x(t+d) or between $x_1(t)$ and $x_1(t+d)$ or between $x_1(t)$ and $x_2(t+d)$ is computed.

In other words, to perform an autocorrelation on the basis of an input signal $x_1$, a similarity between signal portions $x_1(t)$ and $x_1(t+d)$ may be determined for different values of the "autocorrelation lag" d, and it may be determined for which d a resulting similarity value takes a maximum value. $x_1(t)$ is represented by a first zero crossing value sequence, and $x_1(t+d)$ is represented by a second zero crossing value sequence, wherein the second zero crossing value sequence is dependent from the chosen d. By comparing the first zero crossing value sequence and the second zero crossing value sequence for different values of d, it can be determined for which value d the first zero crossing value sequence and the second zero crossing sequence (which all belong to the signal $x_1$, just for different values d) are most similar. Consequently, the value of d maximizing the similarity can be determined.

Alternatively, the cross-correlation between two input signals of $x_1(t)$ and $x_2(t)$ can be determined. Signal sections associated with $x_1(t)$ and $x_2(t+d)$ can be compared, for example, for different values of d by comparing zero crossing value sequences associated with $x_1(t)$ and $x_2(t+d)$. The result of the comparison of the respective zero crossing value sequences allows a good conclusion to the similarity of the respective signals $x_1(t)$ and $x_2(t+d)$.

Thus, by comparing zero crossing value sequences (for example, using an autocorrelation, a cross-correlation or any other comparison function) a numerical result can be obtained which is a good estimate of a direct comparison between the underlying signal portions $x_1(t)$ and $x_1(t+d)$ or $x_1(t)$ and $x_2(t+d)$.

In the following, some further comments will be provided and some further optional extensions will be briefly discussed.

It should be noted that even a sample-accurate correlation has resulted in miss-detections (erroneous detections) when used for a sample data. These erroneous detections do not appear using the zero crossing method discussed herein. Thus, by suing an iterative concept or a method, which is based on initially using the zero crossing method, a sample-accurate correlation result can be improved. For example, a sample-accurate correlation can be used once a coarser result has been obtained using the zero-crossing-approach described herein. Thus, the concept described herein can also comprise an advantage beyond optimizing computational effort, namely an algorithmic advantage.

Moreover, the embodiments disclosed herein may optionally be supplemented by a reliability check block (or step) which determines a reliability information with respect to a correlation result. For example, a spectral flatness or spectral flatness measure may be computed over a correlation result (for example, over an autocorrelation function or over a cross-correlation function). A measure of spectral flatness serves as a quality measure for a quality of the correlation results. The more a peak raises over its surrounding the more reliable is the result. In other words, the reliability check block may compute a measure of spectral flatness of an autocorrelation function (e.g. autocorrelation function 222) or of a cross correlation function (e.g. cross correlation function 332) and may derive the reliability information (describing a reliability of the respective correlation function) from the measure of spectral flatness.

Moreover, the embodiments disclosed herein may optionally be extended to perform an iterative search. For example, a comparatively large block size (for example, of the portions of the at least one input signal) may be used in a first step, such that each of the zero crossing values represents such a comparatively large block. Accordingly, a coarse result (for example, of the similarity information) may be obtained, which is not very sensitive to small time shifts. Subsequently, a comparatively smaller block size (for example, of the portions of the at least one input audio signal) may be used (for example, in a second step) to obtain a refined similarity information. A search range (for example, a range over which a zero crossing value sequence is computed) used in the second step may be dependent on a result of the first step. Accordingly, the first step using comparatively large blocks (to which a respective zero crossing value is associated) and thus a comparatively large search range, may be used to determine a search range used in the second step, wherein the search range in the second step may be smaller than the search range in the first step (for example, due to the smaller block size used in the second step).

To conclude, several embodiments have been described, in which using of zero crossing values, or zero crossing value sequences allows to approximate a result of an auto-correlation or a cross-correlation of one or more technically meaningful signals (for example, audio signals, video signals, or the like), wherein a complexity can be kept small, and wherein a quality of the results is typically very good.

It should also be noted that embodiments according to the invention can be used for a measurement of latency, as mentioned above.

10. Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

An embodiment creates an apparatus for determining a similarity information on the basis of one or more input signals, as described herein.

Another embodiment creates a method for performing any of the functionality of the apparatus described or claimed herein.

Another embodiment creates a computer program for performing said method.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for determining a similarity information on the basis of one or more input signals which are audio signals or video signals,
wherein the apparatus is configured to determine a zero crossing information describing a number of zero crossings in a respective portion for a plurality of portions of the at least one of the one or more input signals, and
wherein the apparatus is configured to perform a comparison on the basis of the zero crossing information, in order to determine the similarity information describing a similarity between different parts or sections of a single input signal or between different parts or sections of two signals to be compared;
wherein the apparatus is configured to determine two or more representative values per signal block for a plurality of signal blocks,
wherein the two or more representative values describe features of the signal blocks, and
wherein the two or more representative values comprise a zero crossing value which is a zero crossing information; and
wherein the apparatus is configured to determine a spectral flatness measure as one of the two representative values which are determined per signal block, and/or
wherein the apparatus is configured to determine spectral flux values as one of the two representative values which are determined per signal block,
wherein the spectral flux values describe, in the form of a single quantitative value, a change between spectra of two respective successive signal blocks;
wherein the apparatus is configured to perform the comparison on the basis of the two or more representative values, in order to determine the similarity information,
wherein the apparatus is configured to perform a first comparison on the basis of a sequence of representative values of a first type for a plurality of signal blocks, and to perform a second comparison on the basis of a sequence of representative values of a second type for the plurality of signal blocks,
wherein the apparatus is configured to compare a first zero crossing value sequence, which comprises a plurality of zero crossing values, and a second zero crossing value sequence, which comprises a plurality of zero crossing values, to acquire a similarity information describing a similarity between a first signal section and a second signal section, wherein the first zero crossing value sequence corresponds to the first signal section, and wherein the second zero crossing value sequence corresponds to the second signal section, and
wherein the zero crossing values constitute the zero crossing information;
wherein the apparatus is configured to compare a result of the first comparison and a result of the second comparison, in order to acquire a reliability information;
wherein the apparatus is configured to receive one or more audio signals or one or more video signals as the one or more input signals, and to determine the zero crossing information on the basis of the one or more audio signals or on the basis of the one or more video signals; and
wherein the apparatus for determining the similarity information is implemented using a hardware apparatus, using a computer, or using a combination of the hardware apparatus and the computer.

2. The apparatus according to claim 1, wherein the apparatus is configured to determine, as the zero crossing information, a total number of zero crossings, or a number of rising zero crossings, or a number of falling zero crossings for a plurality of portions of the at least one of the one or more input signals.

3. The apparatus according to claim 1, wherein the apparatus is configured to determine, as the zero crossing information, a zero crossing rate for a plurality of portions of the at least one of the one or more input signals.

4. The apparatus according to claim 1, wherein the apparatus is configured to determine the zero crossing information such that at least one zero crossing value is associated with each portion of a plurality of portions of the at least one of the one or more input signals.

5. The apparatus according to claim 1,
wherein the apparatus is configured to determine a first zero crossing value sequence for a first signal section, wherein the first signal section comprises a plurality of signal blocks, and wherein the first zero crossing value sequence comprises one or more zero crossing values associated with each of the signal blocks of the first signal section; and
wherein the apparatus is configured to determine a second zero crossing value sequence for a second signal section, wherein the second signal section comprises a plurality of signal blocks, and wherein the second zero crossing value sequence comprises one or more zero crossing values associated with each of the signal blocks of the second signal section.

6. The apparatus according to claim 1, wherein the apparatus is configured to compute an correlation value using the first zero crossing value sequence and the second zero crossing value sequence, to acquire the similarity information; or
wherein the apparatus is configured to compute an average magnitude difference value using the first zero crossing value sequence and the second zero crossing value sequence, to acquire the similarity information; or
wherein the apparatus is configured to compute a norm of a difference between the first zero crossing value sequence and the second zero crossing value sequence, to acquire the similarity information; or
wherein the apparatus is configured to compute an Euclidean distance between the first zero crossing value sequence and the second zero crossing value sequence, to acquire the similarity information.

7. The apparatus according to claim 1, wherein the apparatus is configured to compute a plurality of difference measure values between the first zero crossing value sequence, or a portion thereof, and a plurality of time-shifted versions of the second zero crossing value sequence, or time-shifted portions thereof, to acquire an information about a time shift which provides a maximum similarity between the first zero crossing value sequence, or a portion thereof, and a time shifted version of the second zero crossing value sequence, or a portion thereof.

8. The apparatus according to claim 1, wherein the apparatus is configured to compute a correlation function using the first zero crossing value sequence and the second zero crossing value sequence, to acquire an information about a time shift which provides a maximum similarity between the first zero crossing value sequence, or a portion thereof, and a time shifted version of the second zero crossing value sequence, or a portion thereof; or
wherein the apparatus is configured to compute an average magnitude difference function using the first zero crossing value sequence and the second zero crossing value sequence, to compare a portion of the of the first zero crossing value sequence and time-shifted portions of the second zero crossing value sequence, and to acquire an information about a time shift which provides for a maximum similarity between the first zero crossing value sequence, or a portion thereof, and a time shifted version of the second zero crossing value sequence, or a portion thereof.

9. The apparatus according to claim 1, wherein the apparatus is configured to remove a constant component from the first zero crossing value sequence and/or from the second zero crossing value sequence before comparing the first zero crossing value sequence and the second zero crossing value sequence.

10. The apparatus according to claim 1, wherein the apparatus is configured to remove a constant component from the one or more input signals, and/or to apply a high pass filtering to the one or more input signals before determining the zero crossing information.

11. The apparatus according to claim 1, wherein the representative values comprise, per signal block, a positive zero crossing value describing a number of rising zero crossings in a respective signal block, and a negative zero crossing value describing a number of falling zero crossings in a respective signal block.

12. The apparatus according to claim 1, wherein the apparatus is configured to determine one of the two representative values which are determined per signal block using a frequency domain representation of a respective signal block.

13. The apparatus according to claim 1, wherein the apparatus is configured to determine spectral flatness values describing a flatness of a spectrum of a respective signal block as one of the two representative values which are determined per signal block.

14. The apparatus according to claim 1, wherein the apparatus is configured to determine linear prediction coefficients for a respective signal block as one of the two representative values which are determined per signal block.

15. The apparatus according to claim 1, wherein the apparatus is configure to receive one or more audio signals or one or more video signals as the one or more input signals, and to determine the zero crossing information on the basis of the one or more audio signals or on the basis of the one or more video signals.

16. The apparatus according to claim 1, wherein the apparatus is configured to use the similarity information in order to acquire an autocorrelation information regarding an audio signal or a video signal; or
wherein the apparatus is configured to use the similarity information in order to acquire a cross correlation information with respect to two audio signals or with respect to two video signals; or
wherein the apparatus is configured to use the similarity information in order to determine a time shift to acquire best possible alignment between two audio signals, or to determine a time shift to acquire best possible alignment between two video signals.

17. The apparatus according to claim 1, wherein the apparatus is configured to determine a first zero crossing information using a first block size in a first step and to perform the comparison on the basis of the first zero crossing information, in order to acquire an information representing a time shift between similar regions of the one or more input signals, and
wherein the apparatus is configured to determine a second zero crossing information using a second block size in a second step, in order to acquire a refined information representing a time shift between similar regions of the one or more input signals,
wherein a range for which the second zero crossing information is determined is dependent on the information representing a time shift between similar regions of the one or more input signals acquired in the first step, and wherein the second block size is smaller than the first block size.

18. A method for determining a similarity information on the basis of one or more input signals which are audio signals or video signals,
> wherein the method comprises determining a zero crossing information describing a number of zero crossings in a respective portion for a plurality of portions of the at least one of the one or more input signals, and
>
> wherein the method comprises performing a comparison on the basis of the zero crossing information, in order to determine the similarity information describing a similarity between different parts or sections of a single input signal or between different parts or sections of two signals to be compared;

wherein the method comprises determining two or more representative values per signal block for a plurality of signal blocks, wherein the two or more representative values describe features of the signal blocks, and wherein the two or more representative values comprise a zero crossing value which is a zero crossing information; and wherein the method comprises determining spectral flatness measures as one of the two or more representative values which are determined per signal block, and/or wherein the method comprises determining spectral flux values as one of the two or more representative values which are determined per signal block, wherein the spectral flux values describe, in the form of a single quantitative value, a change between spectra of two respective successive signal blocks;

wherein the method comprises performing the comparison on the basis of the two or more representative values, in order to determine the similarity information, wherein a first comparison is performed on the basis of a sequence of representative values of a first type for a plurality of signal blocks, and wherein a second comparison is performed on the basis of a sequence of representative values of a second type for the plurality of signal blocks, wherein a first zero crossing value sequence, which comprises a plurality of zero crossing values, and a second zero crossing value sequence, which comprises a plurality of zero crossing values, are compared, to acquire a similarity information describing a similarity between a first signal section and a second signal section, wherein the first zero crossing value sequence corresponds to the first signal section, and wherein the second zero crossing value sequence corresponds to the second signal section, and wherein the zero crossing values constitute the zero crossing information, wherein a result of the first comparison and a result of the second comparison is compared, in order to acquire a reliability information;

wherein the method comprises receiving one or more audio signals or one or more video signals as the one or more input signals, and determining the zero crossing information on the basis of the one or more audio signals or on the basis of the one or more video signals.

19. A non-transitory digital storage medium having a computer program stored thereon to perform the method for determining a similarity information on the basis of one or more input signals which are audio signals or video signals,
> wherein the method comprises determining a zero crossing information describing a number of zero crossings in a respective portion for a plurality of portions of the at least one of the one or more input signals, and
>
> wherein the method comprises performing a comparison on the basis of the zero crossing information, in order to determine the similarity information describing a similarity between different parts or sections of a single input signal or between different parts or sections of two signals to be compared;

wherein the method comprises determining two or more representative values per signal block for a plurality of signal blocks, wherein the two or more representative values describe features of the signal blocks, and wherein the two or more representative values comprise a zero crossing value which is a zero crossing information; and wherein the method comprises determining spectral flatness measures as one of the two or more representative values which are determined per signal block, and/or wherein the method comprises determining spectral flux values as one of the two or more representative values which are determined per signal block, wherein the spectral flux values describe, in the form of a single quantitative value, a change between spectra of two respective successive signal blocks;

wherein the method comprises performing the comparison on the basis of the two or more representative values, in order to determine the similarity information, wherein a first comparison is performed on the basis of a sequence of representative values of a first type for a plurality of signal blocks, and wherein a second comparison is performed on the basis of a sequence of representative values of a second type for the plurality of signal blocks, wherein a first zero crossing value sequence, which comprises a plurality of zero crossing values, and a second zero crossing value sequence, which comprises a plurality of zero crossing values, are compared, to acquire a similarity information describing a similarity between a first signal section and a second signal section, wherein the first zero crossing value sequence corresponds to the first signal section, and wherein the second zero crossing value sequence corresponds to the second signal section, and wherein the zero crossing values constitute the zero crossing information, wherein a result of the first comparison and a result of the second comparison is compared, in order to acquire a reliability information;

wherein the method comprises receiving one or more audio signals or one or more video signals as the one or more input signals, and determining the zero crossing information on the basis of the one or more audio signals or on the basis of the one or more video signals, when said computer program is run by a computer.

* * * * *